(12) United States Patent
Liu et al.

(10) Patent No.: US 12,192,894 B2
(45) Date of Patent: Jan. 7, 2025

(54) MULTI-LINK HIBERNATION MODE FOR WLAN

(71) Applicant: Apple Inc., Cupertino, CA (US)

(72) Inventors: Yong Liu, Campbell, CA (US); Su Khiong Yong, Palo Alto, CA (US); Qi Wang, Sunnyvale, CA (US); Tianyu Wu, Monterey, CA (US); Lochan Verma, Danville, CA (US); Jinjing Jiang, Campbell, CA (US); Jarkko L. Kneckt, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/213,674

(22) Filed: Jun. 23, 2023

(65) Prior Publication Data

US 2024/0073812 A1     Feb. 29, 2024

Related U.S. Application Data

(63) Continuation of application No. 17/324,518, filed on May 19, 2021, now Pat. No. 11,737,018.

(Continued)

(51) Int. Cl.
*H04W 52/02* (2009.01)
*H04W 28/02* (2009.01)
*H04W 76/25* (2018.01)

(52) U.S. Cl.
CPC ... *H04W 52/0206* (2013.01); *H04W 28/0263* (2013.01); *H04W 76/25* (2018.02)

(58) Field of Classification Search
CPC ......... H04W 28/0263; H04W 52/0206; H04W 76/25; H04W 76/14; H04W 76/27;
(Continued)

(56) References Cited

U.S. PATENT DOCUMENTS 9,374,190 B2     6/2016  Koskela et al.
9,842,442 B2 *  12/2017  Konicek ............ G07C 9/00182
(Continued)

FOREIGN PATENT DOCUMENTS

CN    101232706 A    7/2008
CN    103857023 A    6/2014
(Continued)

OTHER PUBLICATIONS

Chinese First Office Action directed to Chinese Patent Application No. 202110609515.1, mailed May 7, 2024; 15 pages.
(Continued)

*Primary Examiner* — Nathan S Taylor
(74) *Attorney, Agent, or Firm* — Sterne, Kessler, Goldstein & Fox P.L.L.C.

(57) ABSTRACT

Some aspects of this disclosure include apparatuses and methods for implementing a hibernation mode for multi-link wireless communication networks such as a wireless local area network (WLAN). For example, some aspects relate to a multi-link device (MLD) including a first station (STA) associated with a first link of a wireless network and configured to communicate with a second MLD over the first link. The MLD also includes a second STA associated with a second link of the wireless network. The second STA is in a hibernation mode. The MLD also includes one or more processors communicatively coupled to the first and second STAs and configured to control operations of the first and second STAs.

20 Claims, 16 Drawing Sheets

Related U.S. Application Data

(60) Provisional application No. 63/033,486, filed on Jun. 2, 2020.

(58) Field of Classification Search
CPC ..... H04W 88/04; H04W 28/02; H04W 52/02; H04W 76/15; H04W 76/28; H04W 84/12
See application file for complete search history.

(56) References Cited

U.S. PATENT DOCUMENTS

| | | | |
|---|---|---|---|
| 10,609,647 B2 | 3/2020 | Cariou et al. | |
| 10,897,689 B2 | 1/2021 | Sui et al. | |
| 11,224,046 B2* | 1/2022 | Atefi | H04W 28/18 |
| 11,388,669 B2* | 7/2022 | Medles | H04W 52/0229 |
| 11,564,169 B2 | 1/2023 | Li et al. | |
| 11,652,562 B2 | 5/2023 | Parkvall et al. | |
| 2014/0086141 A1* | 3/2014 | Morioka | H04W 52/02 370/315 |
| 2015/0244816 A1 | 8/2015 | Pagani | |
| 2015/0295797 A1* | 10/2015 | Kneckt | H04L 43/062 370/252 |
| 2017/0353926 A1* | 12/2017 | Zhu | H04W 52/0245 |
| 2018/0092039 A1* | 3/2018 | Cariou | H04W 52/34 |
| 2018/0206190 A1* | 7/2018 | Cherian | H04L 1/1621 |
| 2018/0206290 A1 | 7/2018 | Cherian et al. | |
| 2019/0103908 A1* | 4/2019 | Yu | H04B 7/0617 |
| 2019/0191379 A1 | 6/2019 | Huang et al. | |
| 2019/0191476 A1* | 6/2019 | Zhang | H04W 36/0027 |
| 2019/0297571 A1 | 9/2019 | Jose et al. | |
| 2019/0320469 A1* | 10/2019 | Huang | H04W 74/0833 |
| 2019/0335454 A1* | 10/2019 | Huang | H04W 72/542 |
| 2020/0196110 A1* | 6/2020 | Jakobsson | H04W 76/14 |
| 2020/0245249 A1* | 7/2020 | Medles | H04W 72/23 |
| 2020/0288523 A1* | 9/2020 | Patil | H04W 80/02 |
| 2021/0007168 A1* | 1/2021 | Asterjadhi | H04W 52/0216 |
| 2021/0029588 A1* | 1/2021 | Cariou | H04W 40/244 |
| 2021/0045095 A1* | 2/2021 | Cariou | H04W 76/15 |
| 2021/0058868 A1* | 2/2021 | Cariou | H04W 52/0206 |
| 2021/0084711 A1* | 3/2021 | Park | H04W 72/0453 |
| 2021/0136681 A1* | 5/2021 | Mai | G08B 29/188 |
| 2021/0144787 A1* | 5/2021 | Kwon | H04W 76/15 |
| 2021/0160742 A1* | 5/2021 | Li | H04W 36/0011 |
| 2021/0168816 A1* | 6/2021 | Atefi | H04W 28/18 |
| 2021/0185607 A1* | 6/2021 | Cariou | H04W 52/0216 |
| 2021/0211871 A1* | 7/2021 | Chu | H04W 12/06 |
| 2021/0212141 A1* | 7/2021 | Chu | H04W 48/12 |
| 2021/0219363 A1* | 7/2021 | Jiang | H04W 24/08 |
| 2021/0250848 A1* | 8/2021 | Seok | H04W 48/16 |
| 2021/0259033 A1* | 8/2021 | Kim | H04W 76/11 |
| 2021/0266891 A1* | 8/2021 | Chu | H04L 5/1469 |
| 2021/0282119 A1* | 9/2021 | Asterjadhi | H04W 76/15 |
| 2021/0282210 A1* | 9/2021 | Liu | H04W 52/0235 |
| 2021/0289442 A1* | 9/2021 | Naribole | H04W 52/0222 |
| 2021/0321243 A1* | 10/2021 | Patil | H04W 76/15 |
| 2021/0321410 A1* | 10/2021 | Patil | H04W 72/27 |
| 2021/0337475 A1* | 10/2021 | Cariou | H04L 5/0098 |
| 2021/0352474 A1* | 11/2021 | Bajko | H04W 12/71 |
| 2021/0377851 A1* | 12/2021 | Liu | H04W 52/0206 |
| 2022/0132423 A1* | 4/2022 | Fang | H04W 52/0229 |
| 2022/0132611 A1* | 4/2022 | Fang | H04W 28/06 |
| 2022/0159760 A1* | 5/2022 | Parron | H04L 65/1069 |
| 2022/0418019 A1* | 12/2022 | Kim | H04W 76/15 |
| 2023/0007535 A1* | 1/2023 | Kim | H04W 28/08 |
| 2023/0036253 A1* | 2/2023 | Kim | H04W 84/12 |
| 2023/0046270 A1* | 2/2023 | Huang | H04W 40/12 |
| 2023/0050803 A1* | 2/2023 | Gan | H04W 76/28 |
| 2023/0083599 A1* | 3/2023 | Kim | H04W 52/0216 370/311 |
| 2023/0107072 A1* | 4/2023 | Kim | H04W 28/0278 370/230 |
| 2023/0115361 A1* | 4/2023 | Kim | H04W 76/15 370/311 |
| 2023/0147636 A1* | 5/2023 | Kim | H04W 76/15 370/318 |
| 2023/0156578 A1* | 5/2023 | Kim | H04W 12/04 455/434 |
| 2023/0156606 A1* | 5/2023 | Kim | H04W 84/12 370/329 |
| 2023/0164634 A1* | 5/2023 | Jang | H04W 8/24 370/329 |
| 2023/0189071 A1* | 6/2023 | Kim | H04W 28/16 370/235 |
| 2023/0224814 A1* | 7/2023 | Kim | H04W 52/0216 370/311 |

FOREIGN PATENT DOCUMENTS

| | | |
|---|---|---|
| CN | 104836681 A | 8/2015 |
| CN | 105991181 A | 10/2016 |
| CN | 107820305 A | 3/2018 |
| CN | 109219114 A | 1/2019 |
| CN | 109314951 A | 2/2019 |
| CN | 109588059 A | 4/2019 |
| CN | 109743712 A | 5/2019 |
| JP | 2014138327 A | 7/2014 |

OTHER PUBLICATIONS

LG Electronics, "Method for Handling Constrained MLD," IEEE 802.11, Mar. 16, 2020; 16 pages.

ZTE, "Multi-Link Power Saving Discussion," IEEE 802.11, Jan. 11, 2020; 12 pages.

Notice of Grant and Search Report directed to related Chinese Application No. 202110609515.1, with English-language machine translation attached, mailed Sep. 18, 2024; 6 pages.

\* cited by examiner

MULTI-LINK HIBERNATION MODE FOR WLAN

CROSS-REFERENCE TO RELATED APPLICATIONS

The present application is continuation of U.S. patent application Ser. No. 17/324,518, filed on May 19, 2021, which claims the benefit of U.S. Provisional Patent Application No. 63/033,486, filed on Jun. 2, 2020, both of which are hereby incorporated by reference in their entireties.

BACKGROUND

Field

The described aspects generally relate to channel access in wireless communications, including to a multi-link hibernation mode in multi-link wireless communication networks, such as a wireless local area network (WLAN).

Related Art

A first multi-link device (MLD) can communicate with a second MLD using a plurality of links/channels. For example, the first MLD can use a first radio to communicate with the second MLD's first radio using a first link. The first MLD can also use a second radio to communicate with the second's MLD's second radio using a second link. The two MLDs can communicate more data and/or communicate the data faster using multiple links. However, the MLDs will use more power when two radios are being used.

SUMMARY

Some aspects of this disclosure include apparatuses and methods for implementing a hibernation mode for multi-link wireless communication networks such as a wireless local area network (WLAN). The hibernation mode, and operations for entering and/or exiting the hibernation mode for multi-link WLAN, described in this disclosure can assist the devices in the WLAN (e.g., an access point (AP), a station (STA)) to better utilize channel resources, to save power, and/or to enable virtual STA(s) in the multi-link WLAN.

Some aspects relate to a multi-link device (MLD). The MLD includes a first station (STA) associated with a first link of a wireless network and configured to communicate with a second MLD over the first link. The MLD also includes a second STA associated with a second link of the wireless network. The second STA is in a hibernation mode. The MLD also includes one or more processors communicatively coupled to the first and second STAs and configured to control operations of the first and second STAs.

In some examples, the one or more processors are further configured to transmit, using the first STA on the first link, a message to the second MLD indicating that the second STA is in the hibernation mode. In some examples, the message includes an association request transmitted during an association of the MLD and the second MLD and the message further includes a request to map one or more traffic identifiers (TIDs) at the second MLD to the first and second links.

In some examples, the one or more processors are further configured to transmit, using the first STA, a keep-alive message within a shorter of a first time period and a second time period. The first time period can be a first idle period associated with the first STA and the second time period can be a second idle period associated with the second STA.

In some examples, the one or more processors are further configured to receive, using the first STA and from the second MLD, at least one of an updated Group Temporal Key (GTK) or an updated Integrity GTK (IGTK) associated with the second STA in the hibernation mode.

In some examples, the one or more processors are further configured to transmit, using the second STA and in response to the second STA transitioning to an awake mode, a frame to the second MLD indicating that the second STA has exited the hibernation mode and control the first STA to enter the hibernation mode. In some examples, the first STA includes a first transceiver and the second STA includes a second transceiver different from the first transceiver.

In some examples, the one or more processors are further configured to transmit, using the first STA, a first frame to the second MLD indicating that the first STA is transitioning to the hibernation mode and transition the second STA from the hibernation mode to an awake mode. The one or more processors are further configured to transmit, using the second STA and in response to the second STA transitioning to the awake mode, a second frame to the second MLD indicating that the second STA has exited the hibernation mode.

In some examples, to transition the second STA from the hibernation mode to the awake mode the one or more processors are configured to control a transceiver of the MLD associated with the first STA and the second STA to operate at a frequency associated with the second link.

In some examples, the one or more processors are further configured to determine that the first link is not available and in response to the determination, control the first STA to transition from an awake mode to the hibernation mode. The one or more processors are further configured to transition the second STA from the hibernation mode to the awake mode and transmit a frame, using the second STA, to the second MLD indicating that the second STA has exited the hibernation mode.

In some examples, to transition the second STA from the hibernation mode to the awake mode the one or more processors are configured to control a transceiver of the MLD associated with the first STA and the second STA to operate at a frequency associated with the second link.

In some examples. the one or more processors are further configured to determine that the first link is not available and in response to the determination, transmit, using the first link, a first frame to second MLD indicating that a link switch is occurring. The one or more processors are further configured to control the first STA to transition from an awake mode to the hibernation mode, transition the second STA from the hibernation mode to the awake mode, and transmit a frame, using the second STA, to the second MLD indicating that the second STA has exited the hibernation mode.

In some examples, to transition the second STA from the hibernation mode to the awake mode the one or more processors are configured to control a transceiver of the MLD associated with the first STA and the second STA to operate at a frequency associated with the second link.

Some aspects relate to a method. The method includes transmitting, using a first station (STA) of a first multi-link device (MLD) and on a first link of a wireless network, a first message to a second MLD. The first message indicates that a second STA of the first MLD associated with a second link of the wireless network is in a hibernation mode. The method further includes communicating, using the first STA of the first MLD and on the first link, with the second MLD at least one of a data frame, a management frame, or a control frame.

Some aspects relate to a non-transitory computer-readable medium storing instructions. When the instructions are executed by a processor of a multi-link device (MLD), the instructions cause the processor to perform operations including transmitting, using a first station (STA) of the multi-link device (MLD) and on a first link of a wireless network, a first message to a second MLD. The first message indicates that a second STA of the first MLD associated with a second link of the wireless network is in a hibernation mode. The operations further include communicating, using the first STA of the first MLD and on the first link, with the second MLD at least one of a data frame, a management frame, or a control frame.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1A:
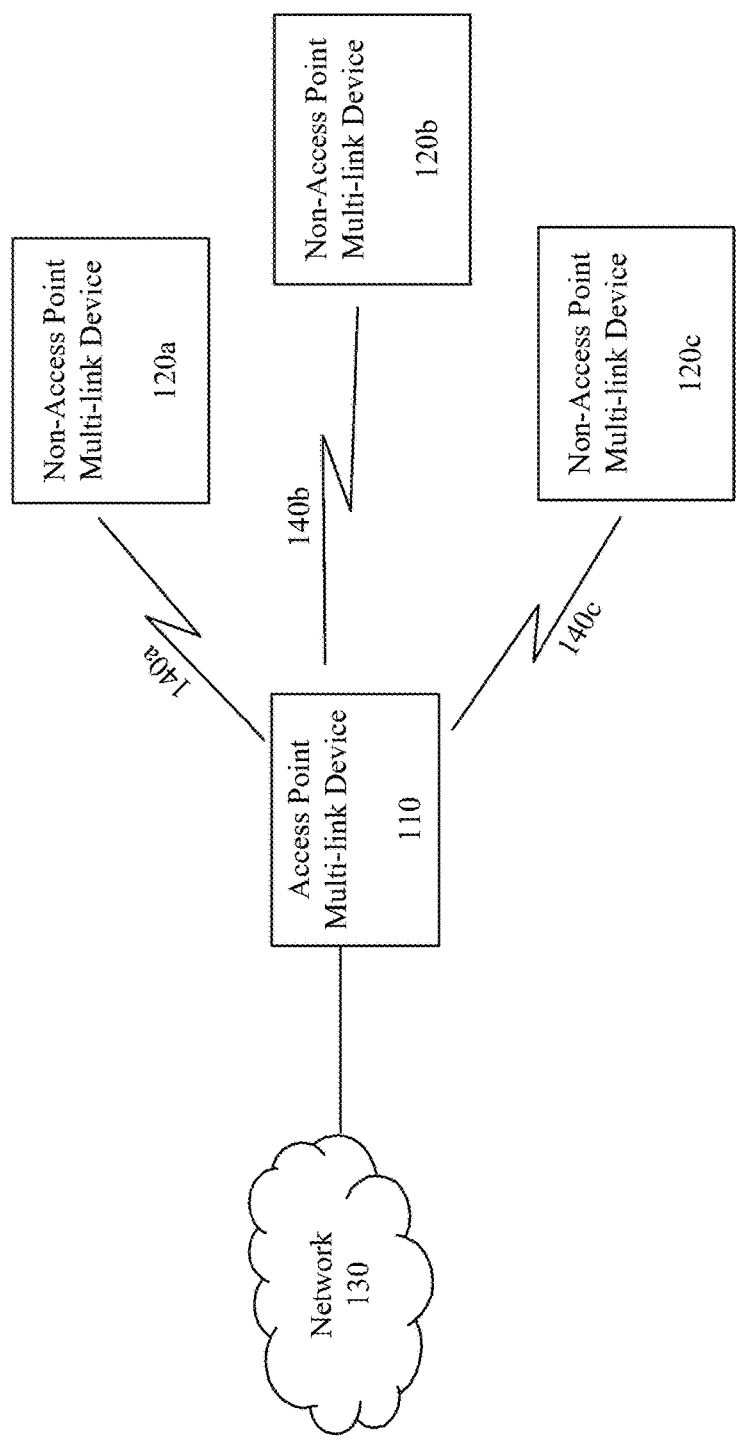
FIG. 1A illustrates an example system implementing hibernation mode in a multi-link communication network, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing a hibernation mode for multi-link wireless communication networks such as a wireless local area network (WLAN). The hibernation mode and operations for entering and/or exiting hibernation mode for multi-link WLAN of the aspects of this disclosure can assist the devices in the WLAN (e.g., an access point (AP), a station (STA)) to better utilize channel resources, to save power, and/or to enable virtual STA(s) in the multi-link WLAN.

According to some aspects, the hibernation mode and hibernation mode's entering and/or exiting operations for multi-link WLAN can be implemented with communication techniques compatible with Institute of Electrical and Electronics Engineers (IEEE) 802.11 standards (such as, but not limited to IEEE 802.11ac, IEEE 802.11ax, IEEE 802.11bc, IEEE 802.11bd, IEEE 802.11be, etc.). However, the aspects of this disclosure can also be extended to operations in other multi-link communication networks.

FIG. 1A illustrates an example system 100 implementing a hibernation mode in a multi-link communication network, according to some aspects of the disclosure. Example system 100 is provided for the purpose of illustration only and does not limit the disclosed aspects. System 100 may include, but is not limited to, access point (AP) multi-link device (MLD) 110, non-AP MLDs 120, and network 130. Non-AP MLDs 120a-120c may include, but are not limited to, Wireless Local Area Network (WLAN) stations such as wireless communication devices, smart phones, laptops, desktops, tablets, personal assistants, monitors, televisions, wearable devices, and the like. AP MLD 110 may include but is not limited to WLAN electronic devices such as a wireless router, a wearable device (e.g., a smart watch), a wireless communication device (e.g., a smart phone), or a combination thereof. Network 130 may be the Internet and/or a WLAN. Non-MLD 120's communications are shown as wireless communications 140. The communication between AP MLD 110 and non-AP MLD 120 can take place using wireless communications 140a-140c. The wireless communications 140a-140c can be based on a wide variety of wireless communication techniques. These techniques can include, but are not limited to, techniques based on IEEE 802.11 (such as, but not limited to IEEE 802.11ac, IEEE 802.11ax, IEEE 802.11bc, IEEE 802.11bd, IEEE 802.11be, IEEE 802.11v, etc. standards).

According to some aspects, AP MLD 110 and non-AP MLDs 120 are configured to implement a multi-link communication. In other words, AP MLD 110 and non-AP MLDs 120 are configured to implement and support simultaneous or substantially simultaneous data transfer using multiple MAC/PHY links. For example, FIG. 1B illustrates an example multi-link communication between two devices, according to some aspects of the disclosure.

Figure 1B:
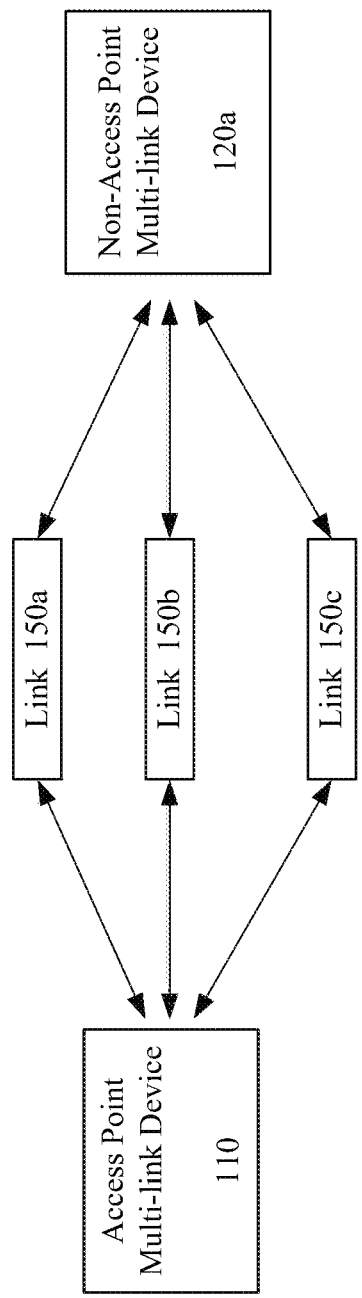
FIG. 1B illustrates an example multi-link communication between two devices, according to some aspects of the disclosure.

As illustrated in FIG. 1B, non-AP MLD 120a and AP MLD 110 can communicate with each other using multiple links 150a-150c. In other words, non-AP MLD 120a and AP MLD 110 can use multiple MAC/PHY links 150a-150c to simultaneously or substantially simultaneously transfer data. Although three links 150 are illustrated, the aspects of this disclosure are not limited to this example and any number of links 150 can be implemented. The links 150 can include different wireless channels, according to some aspects. For example, each wireless channel/link 150 can be defined based on its respective frequency that is different from the others. However, the aspects of this disclosure are no limited to wireless channels and other MAC/PHY layer links can be used as links 150 for communication between non-AP MLD 120a and AP MLD 110.

Also, although links 150a-150c are shown as links between non-AP MLD 120a and AP MLD 110, the aspects of this disclosure are not limited to this example. In some aspects, the multi-link communication can be between two AP MLDs. Additionally or alternatively, the multi-link communication can be between two non-AP MLDs. For example, the communication between two non-AP MLDs (and links 150) can be direct communication (and direct links) between these non-AP MLDs. Additionally or alternatively, the communication between two non-AP MLDs (and links 150) is through AP MLD 110. In this example, wireless communications 140a and 140b, as shown in FIG. 1A, can include links 150a-150c of FIG. 1B According to some aspects, and as discussed in more detail below, non-AP MLD 120a can include two or more radios for communicating with AP MLD 110 using multiple links 150. According to some aspects, and as discussed in more detail below, non-AP MLD 120a, to save power and/or enable virtual stations, can be configured to use only one of its radios to track Delivery Traffic Indication Map (DTIM) beacons and maintain normal communication with AP MLD 110. In some aspects, non-AP MLD 120a can put its other radio(s) or corresponding STAs in a hibernation mode and only activate them when needed.

Figure 2:
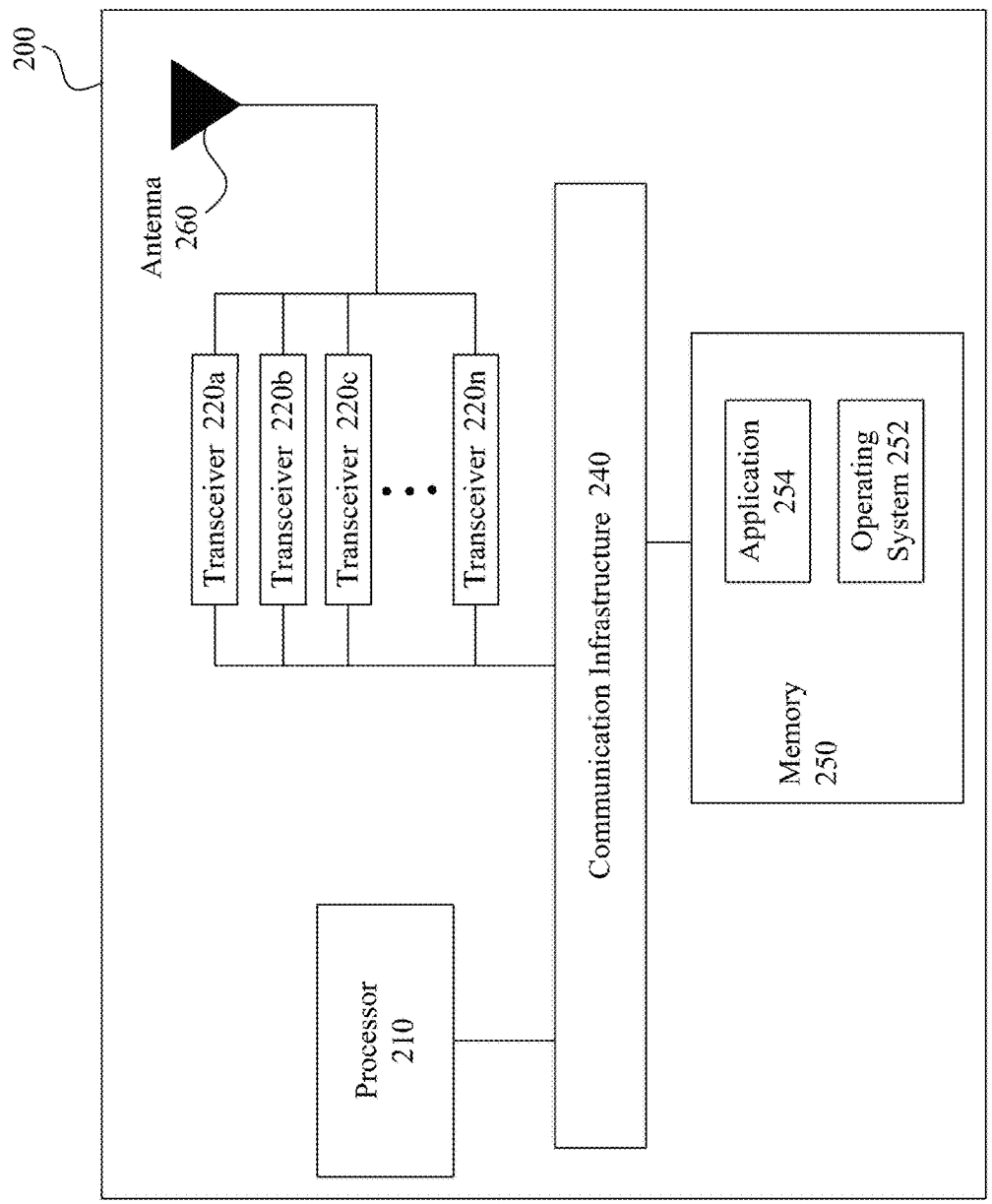
FIG. 2 illustrates a block diagram of an example wireless system of an electronic device implementing the hibernation mode and the hibernation mode's entering and/or exiting operations for multi-link communication network, according to some aspects of the disclosure.

FIG. 2 illustrates a block diagram of an example wireless system 200 of an electronic device implementing the hibernation mode and the hibernation mode's entering and/or exiting operations for multi-link communication network, according to some aspects of the disclosure. System 200 may be any of the electronic devices (e.g., AP MLD 110, non-AP MLD 120) of system 100. System 200 includes processor 210, one or more transceivers 220a-220n, communication infrastructure 240, memory 250, operating system 252, application 254, and antenna 260. Illustrated systems are provided as exemplary parts of wireless system 200, and system 200 can include other circuit(s) and subsystem(s). Also, although the systems of wireless system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers.

At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri®, FaceTime®, radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus. Processor 210 together with instructions stored in memory 250 performs operations enabling wireless system 200 of system 100 to implement the hibernation mode and the hibernation mode's entering and/or exiting operations in the multi-link communication network as described herein. Additionally, or alternatively, one or more transceivers 220a-220n perform operations enabling wireless system 200 of system 100 to implement the hibernation mode and the hibernation mode's entering and/or exiting operations in the multi-link communication network operations as described herein.

One or more transceivers 220a-220n transmit and receive communications signals that support the multi-link hibernation mode, according to some aspects, and may be coupled to antenna 260. (Herein, transceivers can also be referred to as radios). Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, buffers, and like circuits/devices used for connecting to and communication on networks. According to some examples, one or more transceivers 220a-220n include one or more circuits to connect to and communicate on wired and/or wireless networks.

According to some aspects of this disclosure, one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like.

Additionally, or alternatively, one or more transceivers 220a-220n can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220a-220n can include one or more circuits (including a WLAN transceiver) to enable connection(s) and communication over WLAN networks such as, but not limited to, networks based on standards described in IEEE 802.11 (such as, but not limited to IEEE 802.11ac, IEEE 802.11ax, IEEE 802.11bc, IEEE 802.11bd, IEEE 802.11be, etc.). For example, transceiver 220a can enable connection(s) and communication over a multi-link WLAN network having a first link (e.g., link 150a) associated with 2.4 GHz wireless communication channel. For example, transceiver 220b can enable connection(s) and communication over the multi-link WLAN network having a second link (e.g., link 150b) associated with 5 GHz wireless communication channel. For example, transceiver 220c can enable connection(s) and communication over the multi-link WLAN network having a third link (e.g., link 150c) associated with 6 GHz wireless communication channel. However, the aspects of this disclosure are no limited to these wireless channels and other PHY layer links and/or other wireless channels can be used.

Additionally, or alternatively, wireless system 200 can include one WLAN transceiver configured to operate at two or more links. Processor 210 can be configured to control the one WLAN transceiver to switch between different links, according to some examples. For example, transceiver 220a can enable connection(s) and communication over a multi-link WLAN network having a first link (e.g., link 150a) associated with 2.4 GHz wireless communication channel. And transceiver 220b can enable connection(s) and communication over the multi-link WLAN network having a second link (e.g., link 150b) associated with 5 GHz wireless communication channel and can enable connection(s) and communication over the multi-link WLAN network having a third link (e.g., link 150c) associated with 6 GHz wireless communication channel. According to some aspects of the disclosure, the switching from the first link to the second link can include using a transceiver (e.g., transceiver 220b) associated with the second link instead of the transceiver (e.g., transceiver 220a) associated with the first link. Additionally, or alternatively, the switching from the first link to the second link can include controlling a single transceiver (e.g., transceiver 220) to operate at the frequency of the second link instead of operating at the frequency of the first link.

According to some aspects of this disclosure, processor 210, alone or in combination with computer instructions stored within memory 250, and/or one or more transceiver 220a-220n, implements the hibernation mode and the hibernation mode's entering and/or exiting operations in the multi-link communication network as discussed herein. As discussed in more detail below with respect to FIGS. 3-14, processor 210 can implement the hibernation mode and the hibernation mode's entering and/or exiting operations in the multi-link communication network of FIGS. 1A, 1B, and 2.

According to some aspects non-AP MLD 120 can operate at different power management modes. In one example, one power management mode can include a power saving mode. The power saving mode can include a loss-less power saving mode or a lossy power save mode, according to some examples. In the loss-less power saving mode, for DTIM tracking, non-AP MLD 120 can wake up before a DTIM beacon (for example, before every DTIM beacon) and can receive group-addressed frames, according to some aspects. In the loss-less power saving mode, by transmitting a Power Save Poll (PS-Poll) frame or an Unscheduled Automatic Power Save Delivery (U-APSD) Trigger frame, non-AP MLD 120 can solicit individual addressed frame(s) from an AP MLD, according to some aspects.

In the lossy power saving mode, for Basic Service Set (BSS) Max Idle, AP MLD 110 can announce the BSS Max Idle period and AP can maintain non-AP MLD 120's association as far as non-AP MLD 120 sends a keep alive message within the BSS Max Idle period (e.g., about is to about 18 hours), according to some aspects.

In one example, another power management mode can include a Wireless Network Management (WNM) Sleep mode. In some examples, non-AP MLD 120 may request entering the WNM Sleep mode with a specified WNM Sleep Interval (e.g., less than BSS Max Idle period). After entering the WNM Sleep mode, non-AP MLD 120 can skip DTIM beacons and Group Temporal Key (GTK)/Integrity GTK (IGTK) updates, according to some aspects. When existing the WNM Sleep mode, non-AP MLD 120 can get the updated GTK/IGTK from, for example, AP MLD 110.

In one example, another power management mode can include the multi-link hibernation mode. According to some aspects, in the multi-link hibernation mode, non-AP MLD 120 does not track DTIM beacon(s). Additionally, or alternatively, in the multi-link hibernation mode, non-AP MLD 120 does not receive group-addressed frame(s). Additionally, or alternatively, in the multi-link hibernation mode, non-AP MLD 120 does not solicit individual addressed frame(s). Additionally, or alternatively, in the multi-link hibernation mode, non-AP MLD 120 does not send the keep-alive message. Additionally, or alternatively, in the multi-link hibernation mode, non-AP MLD 120 does not perform management handshakes to enter and exit the multi-link hibernation mode.

Figure 3:
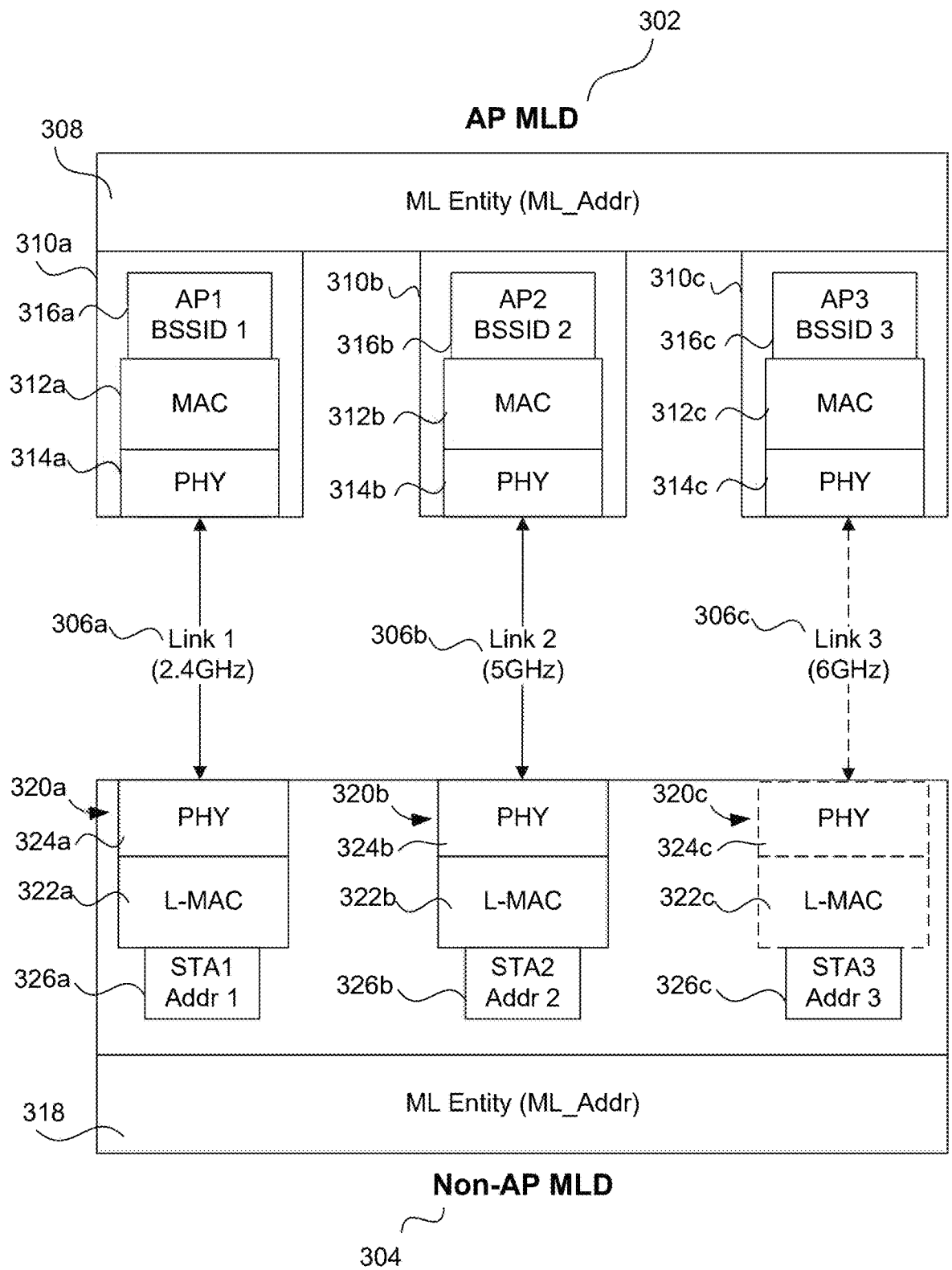
FIG. 3 illustrates an exemplary communication between an access point (AP) multi-link device (MLD) and a non-AP MLD, according to some aspects of the disclosure.

FIG. 3 illustrates an exemplary communication between AP MLD 302 and non-AP MLD 304, according to some aspects of the disclosure. In this example, AP MLD 302 and non-AP MLD 304 can communicate using a multi-link WLAN network having two or more links. For example, AP MLD 302 and non-AP MLD 304 can communicate using links 306a-306c. In some examples, links 306 can be and/or include links 150 of FIG. 1B.

According to some aspects, AP MLD 302 has a multi-link (ML) address 308 associated with AP MLD 304. Also, AP MLD 302 can include three radios/transceivers 310a-310c. For example, AP MLD 302 can include transceiver 310a configured to enable connection(s) and communication over a multi-link WLAN network having the first link (e.g., link 306a) associated with 2.4 GHz wireless communication channel. For example, AP MLD 302 can include transceiver 310b configured to enable connection(s) and communication over the multi-link WLAN network having a second link (e.g., link 306b) associated with 5 GHz wireless communication channel. For example, AP MLD 302 can include transceiver 310c configured to enable connection(s) and communication over the multi-link WLAN network having a third link (e.g., link 306c) associated with 6 GHz wireless communication channel. In other words, AP MLD 302 can include three APs operating on a 2.4 GHz channel, on a 5 GHz channel, and on a 6 GHz channel, respectively. However, the aspects of this disclosure are no limited to these wireless channels and other PHY layer links and/or other wireless channels can be used. Also, AP MLD 302 can include less or more radios/transceivers.

According to some examples, each transceiver 310 can include a medium access control (MAC) layer 312 and a physical (PHY) layer 314. In some examples, each transceiver 310 (e.g., each AP) can have an associated basic service set identifiers (BSSID) 316. In these examples, each transceiver 310 (e.g., each AP) can operate independently (e.g., simultaneous transmission (TX) and reception (RX) (STR)) and each transceiver 310 (e.g., each AP) can start at least one BSS, with different BSSIDs. However, the aspects of this disclosure are no limited to these examples and radios/transceivers 310 can include other structures and/or components.

According to some aspects, non-AP MLD 304 has a multi-link (ML) address 318 associated with non-AP MLD 304. Also, non-AP MLD 304 can include two radios/transceivers 320a-320b. For example, non-AP MLD 304 can include transceiver 320a configured to enable connection(s) and communication over a multi-link WLAN network having the first link (e.g., link 306a) associated with 2.4 GHz wireless communication channel. For example, non-AP MLD 304 can include transceiver 320b configured to enable connection(s) and communication over the multi-link WLAN network having a second link (e.g., link 306b) associated with 5 GHz wireless communication channel or configured to enable connection(s) and communication over the multi-link WLAN network having a third link (e.g., link 306c) associated with 6 GHz wireless communication channel. However, the aspects of this disclosure are no limited to these wireless channels and other PHY layer links and/or other wireless channels can be used. Also, non-AP MLD 304 can include less or more radios/transceivers.

According to some examples, each transceiver 320 can include a lower medium access control (MAC) layer 322 and a physical (PHY) layer 324. Also, each transceiver 320 can have an associated address. However, the aspects of this disclosure are no limited to these examples and radios/transceivers 320 can include other structures and/or components. Each transceiver/radio 320 can also be referred to herein as a station (STA). Additionally, or alternatively, a station (STA) is associated with a specific communication link/channel. For example, a first STA is associated with a first link associated with the 2.4 GHz wireless communication channel. A second STA is associated with a second link associated with the 5 GHz wireless communication channel. And, a third STA is associated with a third link associated with the 6 GHz wireless communication channel.

According to some aspects, when non-AP MLD 304 establishes a multi-link association with AP MLD 302, non-AP MLD 304 may create up to three STAs 326a-326c, each of which associates to one of the APs within AP MLD 302 and each STA 326 has its associated MAC address (different from other STAs). In some examples, non-AP MLD 304 can initially assign the 5/6 GHz transceiver 320b to one of the STAs associated with the 5 GHz and 6 GHz AP, while the other STA 326c does not have an assigned radio, which can be called a virtual STA. The virtual STA can have its own MAC address.

For example, transceiver 320a of STA 326a of non-AP MLD 304 can be associated with and communicate with transceiver 310a (e.g., of one AP) of AP MLD 302 over link 306a associated with a 2.4 GHz wireless communication channel. In this example, transceiver 320b of STA 326b of non-AP MLD 304 can be associated with and communicate with transceiver 310b (e.g., of another AP) of AP MLD 302 over link 306b associated with a 5 GHz wireless communication channel. In this example, STA 326c of non-AP MLD 304 can be a virtual STA. The virtual STA 326c can be associated with and communicate with transceiver 310c (e.g., of a third AP) of AP MLD 302 over link 306c associated with a 6 GHz wireless communication channel. In some examples, virtual STA 326c can use transceiver 320b to communicate with transceiver 310c of AP MLD 302 over link 306c associated with a 6 GHz wireless communication channel. In this example, non-AP MLD 304 (using, for example, one or more processors) can control transceiver 320b to operate at the frequency of link 306c instead of operating at the frequency of link 306b. Additionally, or alternatively, STA 326c can have its own and separate transceiver (e.g., a transceiver 320c).

Figures 4A, 4B:
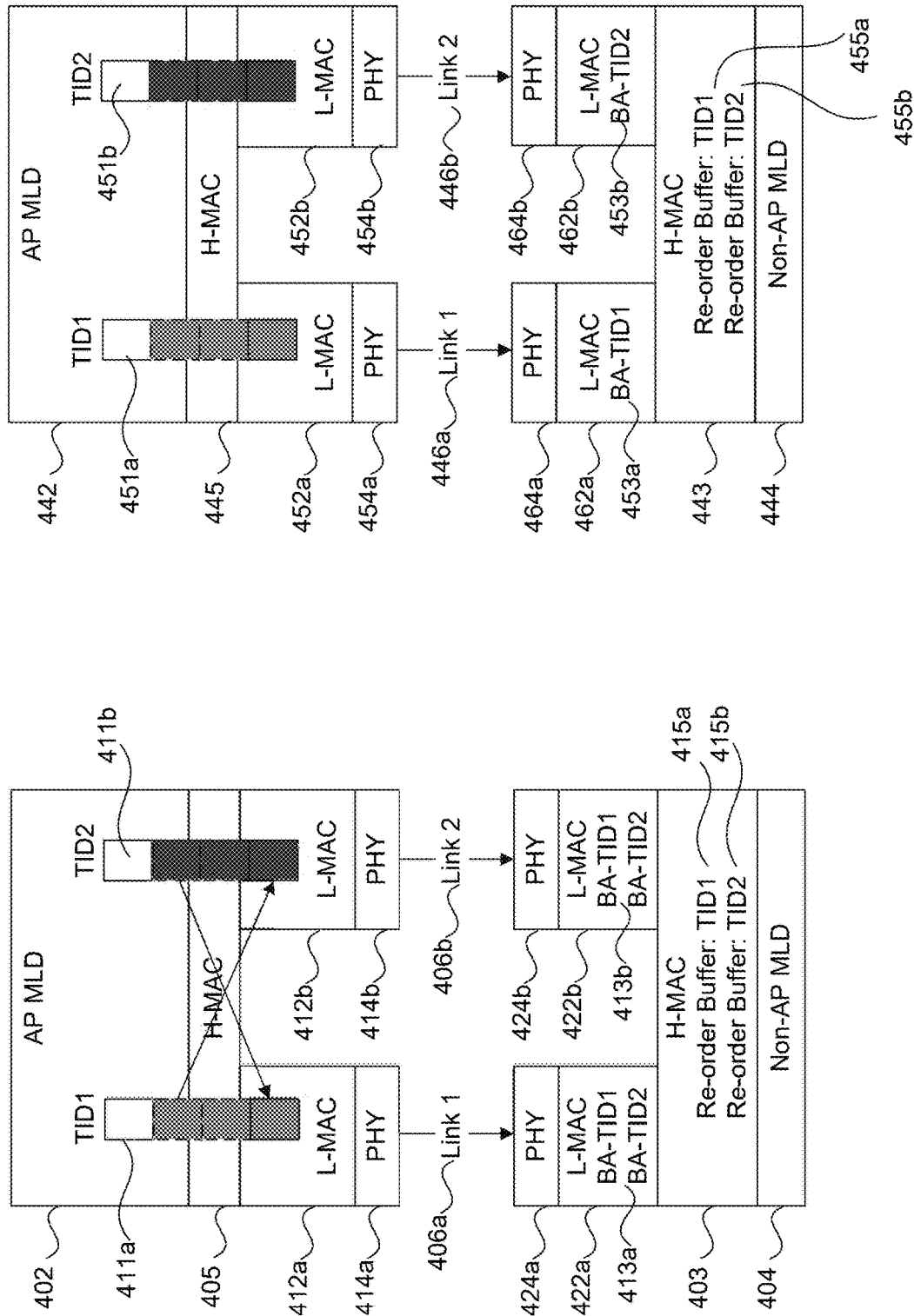
FIGS. 4A and 4B illustrate exemplary traffic identifier (TID) to link mappings, according to some aspects of the disclosure.

FIGS. 4A and 4B illustrate exemplary traffic identifier (TID) to link mappings, according to some aspects of the disclosure.

FIG. 4A illustrates one exemplary TID-to-link mapping 401 where one or more TIDs are mapped to all the links. In this example, AP MLD 402 communicates with non-AP MLD 404. As a non-limiting example, AP MLD 402 can include a higher MAC layer 405 and two APs. Each AP of AP MLD 402 can include a lower MAC layer 412 and a PHY layer 414. In this example, non-AP MLD 404 can include a higher MAC layer 403 and two STAs. Each STA of non-AP MLD 404 can include a lower MAC layer 422 and a PHY layer 424. In this example, each STA of non-AP MLD 404 can be associated with one AP of AP MLD 402. For example, a first STA of non-AP MLD 404 having lower MAC layer 422a and PHY layer 424a can communicate with a first AP of non-AP MLD 402 having lower MAC layer 412a and PHY layer 414a using link 406a. Also, a second STA of non-AP MLD 404 having lower MAC layer 422b and PHY layer 424b can communicate with a second AP of non-AP MLD 402 having lower MAC layer 412b and PHY layer 414b using link 406b.

According to the example TID-to-link mapping 401 of FIG. 4A, AP MLD 402 can include a first buffer 411a for a first traffic with a first TID and a second buffer 411b for a second traffic with a second TID. In this example, first and second buffers 411a and 411b are mapped to both links 406a and 406b. In this example, AP MLD 402 can use both links 406a and 406b (and both APs) to transmit data and/or information in first and second buffers 411a and 411b.

In this example, the block acknowledgment(s) (BA) associated with the first and second TIDs can also be sent from non-AP MLD 404 to AP MLD 402 using both links 406a and 406b. For example, the first STA of non-AP MLD 404 can send BAs 413a associated with both the first and second TIDs to AP MLD 402 using link 406a. Also, the second STA of non-AP MLD 404 can send BAs 413b associated with both the first and second TIDs to AP MLD 402 using link 406b. According to some examples, higher MAC layer 415 of non-AP MLD 404 can include reorder buffers 415a and 415b. In this example, reorder buffer 415a can be associated with the first TID and reorder buffer 415b can be associated with the second TID. Reorder buffers 415 can be used to store and/or reorder the traffic that is received from AP MLD 402 before sending the traffic to higher layers, according to some aspects.

FIG. 4B illustrates one exemplary TID-to-link mapping 441 where different TIDs are mapped to different links. In this example, AP MLD 442 communicates with non-AP MLD 444. As a non-limiting example, AP MLD 442 can include a higher MAC layer 445 and two APs. Each AP of AP MLD 442 can include a lower MAC layer 452 and a PHY layer 454. In this example, non-AP MLD 444 can include a higher MAC layer 443 and two STAs. Each STA of non-AP MLD 444 can include a lower MAC layer 462 and a PHY layer 464. In this example, each STA of non-AP MLD 444 can be associated with one AP of AP MLD 442. For example, a first STA of non-AP MLD 444 having lower MAC layer 462a and PHY layer 464a can communicate with a first AP of non-AP MLD 402 having lower MAC layer 452a and PHY layer 454a using link 446a. Also, a second STA of non-AP MLD 444 having lower MAC layer 462b and PHY layer 464b can communicate with a second AP of non-AP MLD 442 having lower MAC layer 452b and PHY layer 454b using link 446b.

According to the example TID-to-link mapping 441 of FIG. 4B, AP MLD 442 can include a first buffer 451a for a first traffic with a first TID and a second buffer 451b for a second traffic with a second TID. In this example, first buffer 451a is mapped to link 446a and second buffer 451b is mapped to link 446b. In this example, AP MLD 442 can use link 446a (and its associated AP) to transmit data and/or information in first buffer 451a. AP MLD 442 can use link 446b (and its associated AP) to transmit data and/or information in second buffer 451b.

In this example, the block acknowledgment(s) (BA) associated with the first and second TIDs can also be sent from non-AP MLD 444 to AP MLD 442 using their associated link 446a and 446b, respectively. For example, the first STA of non-AP MLD 404 can send BAs 453a associated with the first TID to AP MLD 442 using link 446a. Also, the second STA of non-AP MLD 404 can send BAs 453b associated with the second TID to AP MLD 442 using link 446b. According to some examples, higher MAC layer 455 of non-AP MLD 444 can include reorder buffers 455a and 455b. In this example, reorder buffer 455a can be associated with the first TID and reorder buffer 455b can be associated with the second TID. Reorder buffers 455 can be used to store and/or reorder the traffic that is received from AP MLD 442 before sending the traffic to higher layers, according to some aspects.

Figure 5:
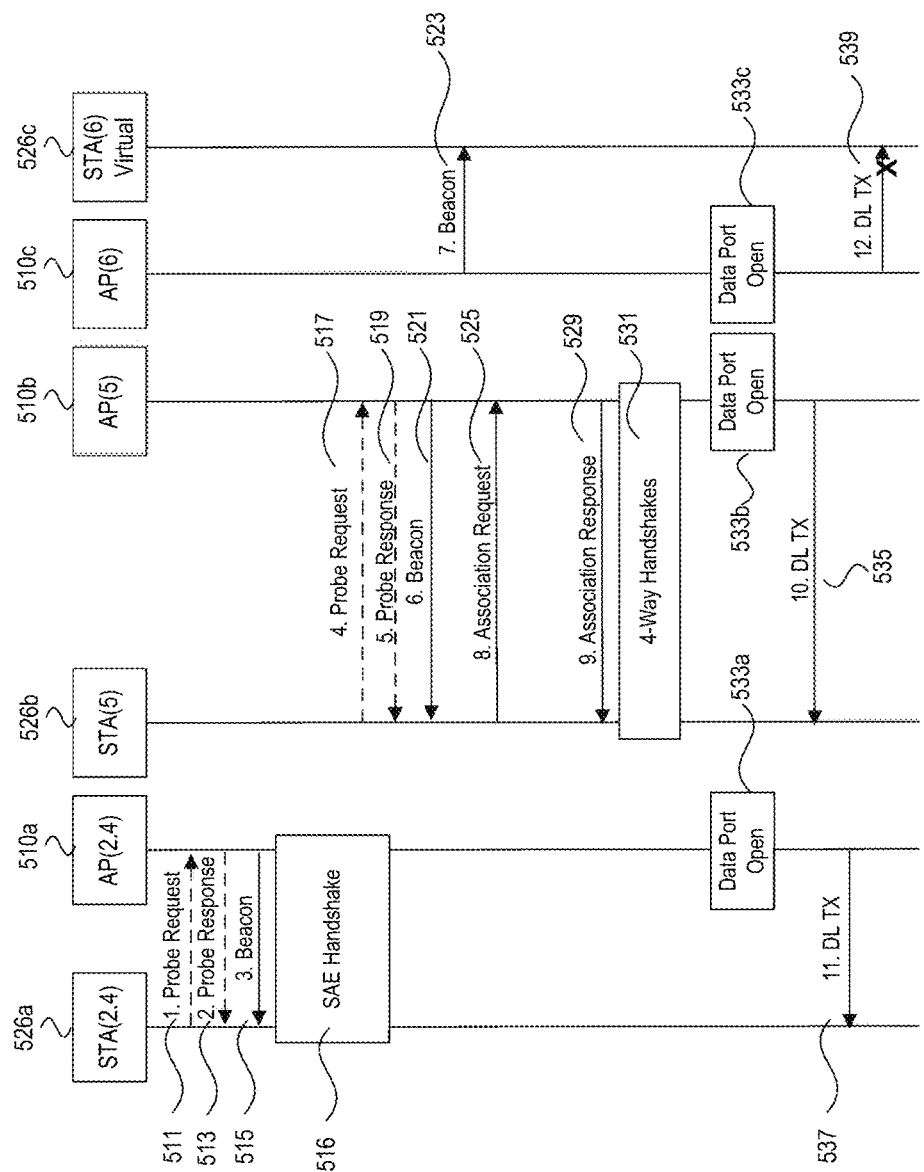
FIG. 5 illustrates exemplary communications between APs of an AP MLD and STAs of a non-AP MLD, according to some aspects of the disclosure.

FIG. 5 illustrates exemplary communications between APs of an AP MLD and STAs of a non-AP MLD, according to some aspects of the disclosure. It is to be appreciated that not all operations in FIG. 5 may be needed, and the operations may not be performed in the same order as shown in FIG. 5. As illustrated in FIG. 5, the AP MLD (e.g., AP MLD 110, 302, 402, and/or 442) can include three APs. A first AP 510a can operate with 2.4 GHz wireless communication channel. A second AP 510b can operate with 5 GHz wireless communication channel. A third second AP 510c can operate with 6 GHz wireless communication channel. The non-AP MLD (e.g., non-AP MLD 120, 304, 404, and/or 444) can include two STAs and one virtual STA. For example, a first STA 526a can operate with 2.4 GHz wireless communication channel. A second STA 526b can operate with 5 GHz wireless communication channel. A virtual STA 526c can operate with 6 GHz wireless communication channel.

According to some examples, STA 526a of the non-AP MLD can communicate with AP 510a of the AP MLD to associate with AP 510a. For example, STA 526a can send probe request 511 to AP 510a. Probe request 511 can include a probe request frame to advertise information about STA 526a and/or to inquire one or more parameters associated with AP 510a. In response, AP 510a can send probe response 513 to STA 526a. Probe response 513 can include one or more probe response frames including, for example, AP 510a's BSSID, supported data rate(s), and other related information. Additionally, or alternatively, AP 510a can send Beacon(s) 515 to STA 526a. According to some examples, at 516, a Simultaneous Authentication of Equals (SAE) handshake can be performed between STA 526a and AP 510a and STA 526a can be associated with AP 510a.

Similarly, STA 526b and AP 510b can communicate messages such that STA 526b can be associated with AP 510b. For example, STA 526b can send probe request 517 to AP 510b. Probe request 517 can include a probe request frame to advertise information about STA 526b and/or to inquire one or more parameters associated with AP 510b. In response, AP 510b can send probe response 519 to STA 526b. Probe response 519 can include one or more probe response frames including, for example, AP 510b's BSSID, supported data rate(s), and other related information. Additionally, or alternatively, AP 510b can send Beacon(s) 521. According to some examples, STA 526b can send association request 525 to AP 510b. According to some examples, association request 525 may also be called Multilink Association Request or Multilink Setup, since it is used to establish association across all links. In one exemplary aspect, association request 525 can include information and/or a request to AP 510b (and the corresponding AP MLD) to map all TIDs to all links (including the virtual link) as discussed in, for example, FIG. 4A. In some examples, mapping all the TIDs to all the link can result in more flexible operation without re-mapping overhead. Alternatively, association request 525 can include information and/or a request to AP 510b (and the corresponding AP MLD) to map different TIDs to different links, as discussed in, for example, FIG. 4B. In some examples, association request 525 can include information and/or a request to AP 510b (and the corresponding AP MLD) for different mappings between TIDs and the links.

In response to association request 525 and in response to the elements of association request 525 matching AP 510b's capabilities, AP 510b and STA 526b can be associated and AP 510b can send association response 529 to STA 526b. In some examples, a 4-way handshake 531 can be performed between AP 510b and STA 526b.

According to some examples, in addition to Beacon(s) 521, AP 510c can send Beacon(s) 523. In some examples, Beacon(s) 521 and/or 523 can be transmitted in broadcast.

In some examples, after STA 526a and AP 510a are associated and/or STA 526b and AP 510b are associated, data port(s) 533a-533c can be opened for data communication between the STAs and the APs. For example, AP 510b can send data 535 to STA 526b. Additionally, or alternatively, AP 510a can send data 537 to STA 526a. In this example, AP 510c cannot send data 539 to virtual STA 526c since STA 526b is using the radio for communicating with AP 510b. In other words, virtual STA 526c does not receive data since STA 526b is using the radio. In some examples, the AP MLD may start downlink transmission(s) to the non-AP MLD on all links after the association (e.g., immediately after the association). However, the non-AP MLD may not support receiving on all the links.

Figure 6:
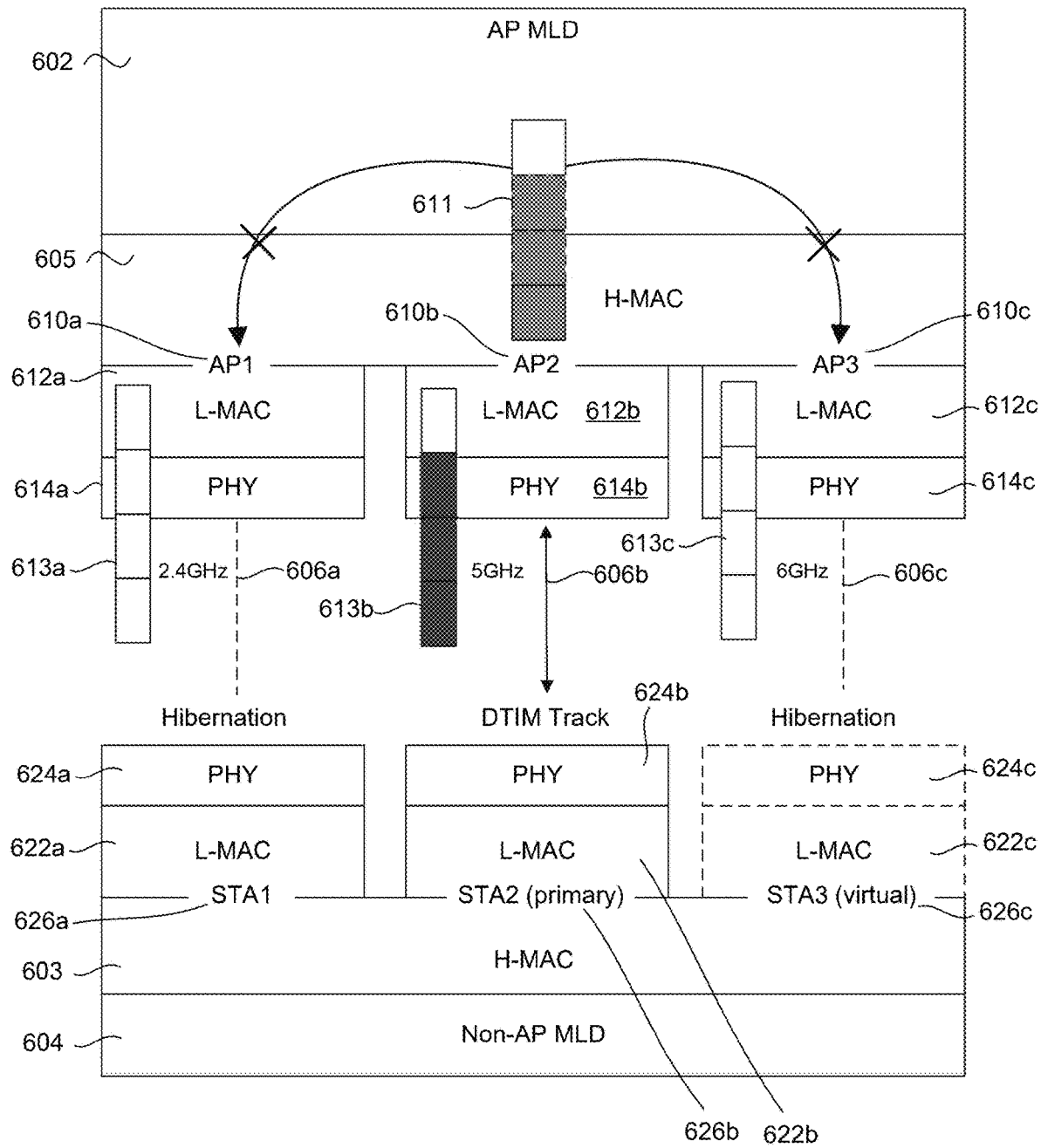
FIG. 6 illustrates an exemplary communication between an AP MLD and a non-AP MLD, according to some aspects of the disclosure.

FIG. 6 illustrates an exemplary communication between AP MLD 602 and non-AP MLD 604, according to some aspects of the disclosure. In this example, AP MLD 602 and non-AP MLD 604 can communicate using a multi-link WLAN network having two or more links. For example, AP MLD 602 and non-AP MLD 604 can communicate using links 606a-606c. In some examples, links 606 can be and/or can include links 150 of FIG. 1B.

According to some aspects, AP MLD 602 has a multi-link (ML) address associated with AP MLD 604. Also, AP MLD 602 can include three radios/transceivers 610a-610c (e.g., three APs). For example, AP MLD 602 can include transceiver 610a (e.g., a first AP) configured to enable connection(s) and communication over a multi-link WLAN network having the first link (e.g., link 606a) associated with 2.4 GHz wireless communication channel. For example, AP MLD 602 can include transceiver 610b (e.g., a second AP) configured to enable connection(s) and communication over the multi-link WLAN network having a second link (e.g., link 606b) associated with 5 GHz wireless communication channel. For example, AP MLD 602 can include transceiver 610c (e.g., a third AP) configured to enable connection(s) and communication over the multi-link WLAN network having a third link (e.g., link 606c) associated with 6 GHz wireless communication channel. In other words, AP MLD 602 can include three APs operating on a 2.4 GHz channel, on a 5 GHz channel, and on a 6 GHz channel, respectively. However, the aspects of this disclosure are no limited to these wireless channels and other PHY layer links and/or other wireless channels can be used. Also, AP MLD 602 can include less or more radios/transceivers/APs.

According to some examples, each transceiver 610 can include a medium access control (MAC) layer 612 and a physical (PHY) layer 614. In some examples, each transceiver 610 (e.g., each AP) can have an associated basic service set identifiers (BSSID). In these examples, each transceiver 610 (e.g., each AP) can operate independently (e.g., simultaneous transmission (TX) and reception (RX) (STR)) and each transceiver 610 (e.g., each AP) can start at least one BSS, with different BSSIDs. However, the aspects of this disclosure are no limited to these examples and radios/transceivers 610 can include other structures and/or components.

Also, as illustrated in FIG. 6, AP MLD 602 can include a higher MAC layer 605. According to some aspects, higher MAC layer 605 can be common for all three transceivers 610 (e.g., APs). In some examples, higher MAC layer 605 can include a buffer 611 for storing data (e.g., packets, frames, etc.) to be transmitted to non-AP MLD 604. Also, each lower MAC layer 612 of each transceiver 610 can include a buffer 613 for transmitting data to associated STA of non-AP MLD 604. For example, lower MAC layer 612a of transceiver 610a can include buffer 613a. Lower MAC layer 612b of transceiver 610b can include buffer 613b. Lower MAC layer 612c of transceiver 610c can include buffer 613c.

According to some aspects, non-AP MLD 604 has a multi-link (ML) address associated with non-AP MLD 604. Also, non-AP MLD 604 can include two radios/transceivers. For example, non-AP MLD 604 can include a first transceiver associated with STA 626a configured to enable connection(s) and communication over a multi-link WLAN network having the first link (e.g., link 606a) associated with 2.4 GHz wireless communication channel. For example, non-AP MLD 604 can include a second transceiver associated with STA 626b configured to enable connection(s) and communication over the multi-link WLAN network having a second link (e.g., link 606b) associated with 5 GHz wireless communication channel or associated with STA 626b configured to enable connection(s) and communication over the multi-link WLAN network having a third link (e.g., link 606c) associated with 6 GHz wireless communication channel. However, the aspects of this disclosure are no limited to these wireless channels and other PHY layer links and/or other wireless channels can be used. Also, non-AP MLD 604 can include less or more radios/transceivers.

According to some examples, each transceiver can include a lower medium access control (MAC) layer 622 and a physical (PHY) layer 624. Also, each transceiver can have an associated address. However, the aspects of this disclosure are no limited to these examples and radios/transceivers can include other structures and/or components. Each transceiver/radio can also be referred to herein as a station (STA). Additionally, or alternatively, a station (STA) is associated with a specific communication link/channel. For example, a first STA is associated with a first link associated with the 2.4 GHz wireless communication channel. A second STA is associated with a second link associated with the 5 GHz wireless communication channel. And, a third STA is associated with a third link associated with the 6 GHz wireless communication channel.

According to some aspects, when non-AP MLD 604 establishes a multi-link association with AP MLD 602, non-AP MLD 604 may create up to three STAs 626a-626c, each of which associates to one of the APs within AP MLD 602 and each STA 626 has its associated MAC address (different from other STAs). In some examples, non-AP MLD 602 can initially assign the 5/6 GHz transceiver to one of the STAs associated with the 5 GHz and 6 GHz AP, while the other STA 626c does not have an assigned radio, which can be called a virtual STA. The virtual STA can have its own MAC address.

For example, the transceiver of STA 626a of non-AP MLD 604 can be associated with and communicate with transceiver 610a (e.g., one AP) of AP MLD 602 over link 606a associated with a 2.4 GHz wireless communication channel. In this example, the transceiver of STA 626b of non-AP MLD 604 can be associated with and communicate with transceiver 610b (e.g., another AP) of AP MLD 602 over link 606b associated with a 5 GHz wireless communication channel. In this example, the transceiver of STA 626c of non-AP MLD 604 can be a virtual STA. The virtual STA 626c can be associated with and communicate with transceiver 610c (e.g., a third AP) of AP MLD 302 over link 606c associated with a 6 GHz wireless communication channel.

According to some aspects, non-AP MLD 604 can request that all TIDs (for both downlink (DL) and uplink (UL)) be mapped to all the links. According to some examples, in order to save power and/or to enable virtual STA, non-AP MLD 604 can use only one of STAs 626a-626c to track DTIM Beacons and maintain normal communication with AP MLD 602. Non-AP MLD 604 can put the other STAs in a hibernation mode and activate them when needed, according to some aspects. For example, as illustrated in FIG. 6, non-AP MLD 604 can put STA 626a and the virtual STA 626c in the hibernation mode. In this examples non-AP MLD 604 can use STA 626b for tracking DTIM Beacons and maintaining normal communication with AP MLD 602. In this example, STA 626b can become the primary STA of non-AP MLD 604.

As discussed above, the hibernation mode can be different from power saving modes and/or WNM sleep modes. According to some aspects, in the hibernation mode (referred to as multi-link hibernation mode too), non-AP MLD 604 does not track DTIM beacon(s). Additionally, or alternatively, in the multi-link hibernation mode, non-AP MLD 604 does not receive group-addressed frame(s). Additionally, or alternatively, in the multi-link hibernation mode, non-AP MLD 604 does not solicit individual addressed frame(s). Additionally, or alternatively, in the multi-link hibernation mode, non-AP MLD 604 does not send the keep-alive message. Additionally, or alternatively, in the multi-link hibernation mode, non-AP MLD 604 does not perform management handshakes to enter and exit the multi-link hibernation mode. According to some aspects, STAs in the hibernation mode need not be waken to track DTIM Beacons, to send keep-alive message(s), and/or to receive updated GTK/IGTK. Also, a STA in the hibernation mode can be able to enter and exit the hibernation mode quickly, without suffering from management handshake and/or processing delays.

According to some aspects, in response to non-AP MLD 604 putting STA 626a and virtual STA 626c in the hibernation mode, AP MLD 602 does not buffer data (e.g., packets, frames, etc.) for the STAs that are in the hibernation mode. For examples, as illustrated in FIG. 6, buffer 613a of lower MAC layer 612a and buffer 613c of lower MAC layer 612c do not have data. In this example, data from buffer 611 is moved to buffer 613b of lower MAC layer 612b for transmission to STA 626b that is not in the hibernation mode.

Figure 7:
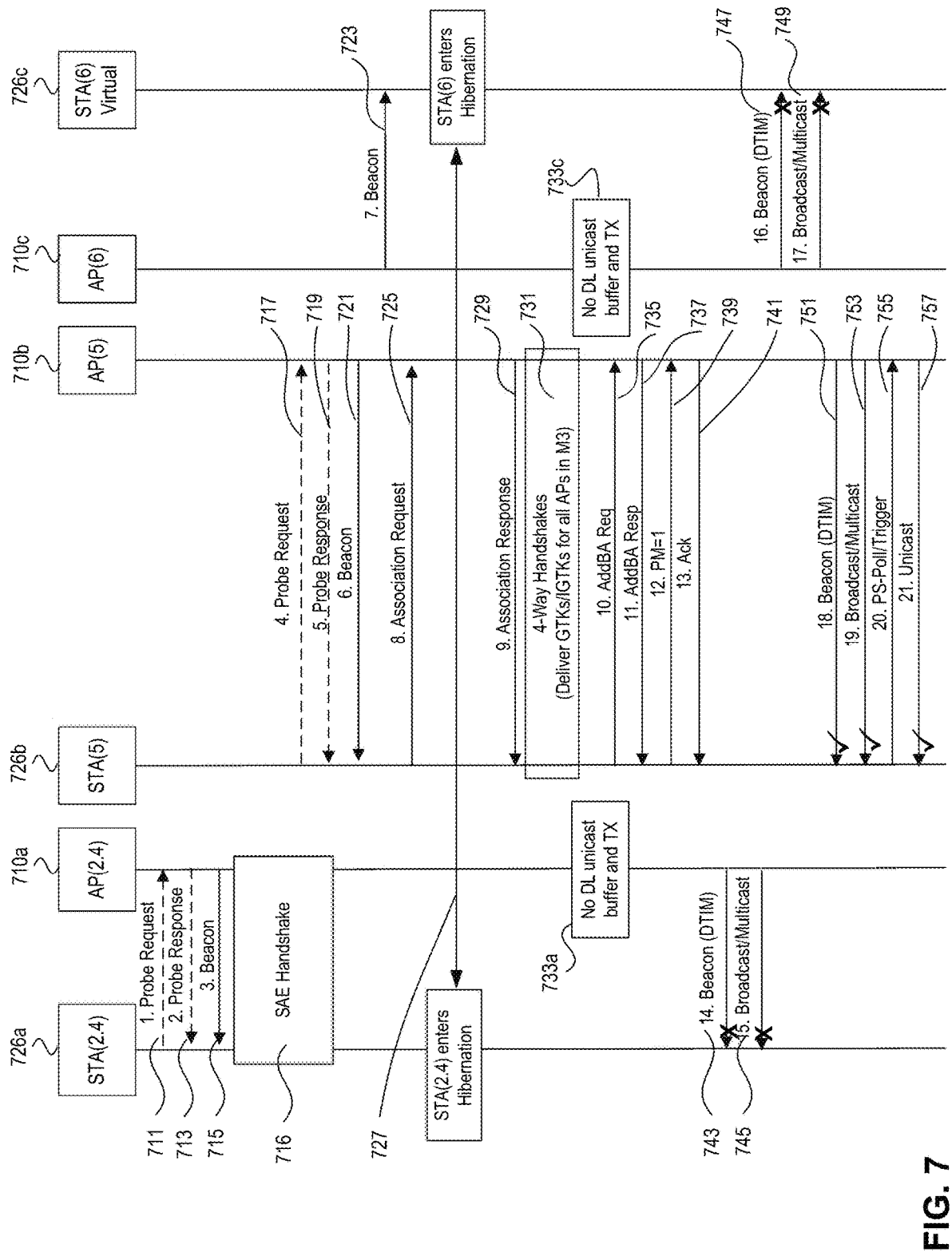
FIG. 7 illustrates exemplary communications between APs of an AP MLD and STAs of a non-AP MLD to enter the hibernation mode during association, according to some aspects of the disclosure.

FIG. 7 illustrates exemplary communications between APs of an AP MLD and STAs of a non-AP MLD to enter the hibernation mode during association, according to some aspects of the disclosure. It is to be appreciated that not all operations in FIG. 7 may be needed, and the operations may not be performed in the same order as shown in FIG. 7. As illustrated in FIG. 7, the AP MLD (e.g., AP MLD 110, 302, 402, 442, and/or 602) can include three APs. A first AP 610a can operate with 2.4 GHz wireless communication channel. A second AP 610b can operate with 5 GHz wireless communication channel. A third second AP 610c can operate with 6 GHz wireless communication channel. The non-AP MLD (e.g., non-AP MLD 120, 304, 404, 444, and/or 604) can include two STA and one virtual STA. For example, a first STA 726a can operate with 2.4 GHz wireless communication channel. A second STA 726b can operate with 5 GHz wireless communication channel. A virtual STA 726c can operate with 6 GHz wireless communication channel.

According to some examples, STA 726a of the non-AP MLD can communicate with AP 710a of the AP MLD to associate with AP 710a. For example, STA 726a can send probe request 711 to AP 710a. Probe request 711 can include a probe request frame to advertise information about STA 726a and/or to inquire one or more parameters associated with AP 710a. In response, AP 710a can send probe response 713 to STA 726a. Probe response 713 can include one or more probe response frames including, for example, AP 710a's BSSID, supported data rate(s), and other related information. Additionally, or alternatively, AP 710a can send Beacon(s) 715 to STA 726a. According to some examples, at 716, a Simultaneous Authentication of Equals (SAE) handshake can be performed between STA 726a and AP 710a and STA 726a can be associated with AP 710a.

Similarly, STA 726b and AP 710b can communicate messages such that STA 726b can be associated with AP 710b. For example, STA 726b can send probe request 717 to AP 710b. Probe request 717 can include a probe request frame to advertise information about STA 726b and/or to inquire one or more parameters associated with AP 710b. In response, AP 710b can send probe response 719 to STA 726b. Probe response 719 can include one or more probe response frames including, for example, AP 710b's BSSID, supported data rate(s), and other related information. Additionally, or alternatively, AP 710b can send Beacon(s) 721. According to some examples, STA 726b can send association request 725 to AP 710b. According to some examples, association request 725 may also be called Multilink Association Request or Multilink Setup, since it is used to establish association across all links. In one exemplary aspect, association request 725 can include information and/or a request to AP 710b (and the corresponding AP MLD) to map all TIDs to all links (including the virtual link) as discussed in, for example, FIG. 4A and/or FIG. 6. In some examples, mapping all the TIDs to all the link can result in more flexible operation without re-mapping overhead. Alternatively, association request 725 can include information and/or a request to AP 710b (and the corresponding AP MLD) to map different TIDs to different links, as discussed in, for example, FIG. 4B. In some examples, association request 725 can include information and/or a request to AP 710b (and the corresponding AP MLD) for different mappings between TIDs and the links.

Additionally, or alternatively, association request 725 can further include information to indicate to AP 710b (and the AP MLD) that STAs 726a and 726c have entered or are to be entering the hibernation mode. At 727, STAs 726a and 726c enter the hibernation mode. In some examples, operation 727 can occur before association request 725. Alternatively, operation 727 can occur after association request 725. In some examples, operation 727 can occur simultaneously or substantially simultaneously with association request 725. According to some examples, information about the TIDs/ links mapping and/or information about association mode may also be included in protected association messages, such as, but not limited to 4-Way handshake message(s) 731 in addition to or in alternative to association request 725. In some examples, having these information in the protected association message(s) can avoid Deny of Service attack.

In response to association request 725 and in response to the elements of association request 725 matching AP 710b's capabilities, AP 710b and STA 726b can be associated and AP 710b can send association response 729 to STA 726b. In some examples, a 4-way handshake 731 can be performed between AP 710b and STA 726b. In some examples, the handshake 731 can also include delivering GTKs/IGTKs for all APs 710a-710c (and/or for all the links associated with STAs in awake and hibernation modes) to STA 726b. According to some aspects, Group Temporal Key (GTK) can be used by STAs to decrypt multicast and/or broadcast traffic from, for example, APs. Integrity GTK (IGTK) can also be used check the integrity of the multicast and/or broadcast traffic from, for example, APs.

According to some examples, in addition to Beacon(s) 721, AP 710c can send Beacon(s) 723. In some examples, Beacon(s) 721 and/or 723 can be transmitted in broadcast.

In some examples, after STA 726b and AP 710b are associated and the AP MLD is informed that STAs 726a and 726c have entered the hibernation mode, AP 710a and AP 710c do not buffer any downlink data at 733a and 733c. Also, APs 710a and 710c do not transmit data to STAs 726a and 726c. In some examples, AP 710a may transmit DTIM Beacon(s) (743) and/or broadcast/multicast data (745) but STAs 726a and/or 726c do not receive these transmissions. Also, AP 710c may transmit DTIM Beacon(s) (747) and/or broadcast/multicast data (749) but STAs 726*a* and/or 726*c* do not receive these transmissions, according to some examples.

According to some examples, STA 726*b* and AP 710*b* can negotiate block acknowledgment (BA) operations and/or parameters during a BA scheme setup. The BA scheme setup can include messages 735-741. For example, STA 726*b* can send an Add Block Acknowledgment (ADDBA) request 735 (including an ADDBA frame) to AP 710*b* and receive an ADDBA response 737 (including an ADDBA frame). The ADDBA signaling 735 and 737 can set up the block acknowledgment transmission scheme. Additionally, or alternatively, STA 726*b* can send a frame 739 to AP 710*b* with Power Management (PM) value set to 1 (PM=1) and receive and acknowledgment (ACK) 741 from AP 710*b*. For example, STA 726*b* can enter a normal power saving mode (e.g., a lossless power saving mode) by transmitting a frame 739 with the PM field set to 1. When AP 710*b* receives frame 739 correctly (and sends back ACK 741), AP 710*b* can pause unicast transmission to STA 726*b*, until STA 726*b* sends a PS-Poll frame or an U-APSD trigger frame (step 755) to AP 710*b* to solicit unicast transmission.

According to some examples, AP 710*b* can transmit DTIM Beacon(s) 751 and/or broadcast/multicast data 753 to STA 726*b*. Additionally, or alternatively, STA 726*b* can transmit Power Save Poll (PS-Poll)/Trigger 755 to AP 710*b*. AP 710*b* can transmit unicast data 757 to AP 710*b*, according to some examples.

Figure 8:
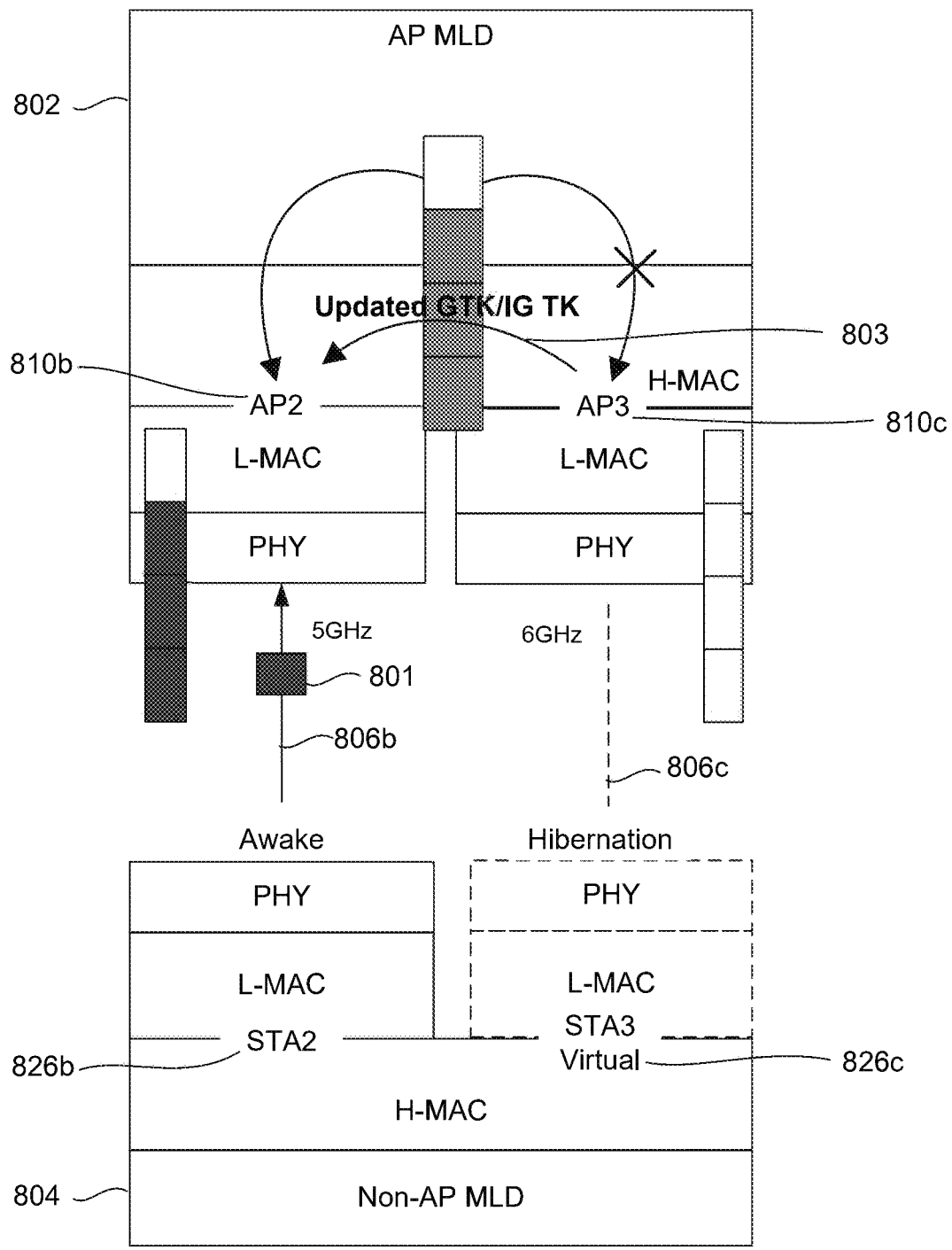
FIG. 8 illustrates exemplary communications between AP MLD 802 and non-AP MLD 804 to communicate keep-alive message(s) and GTK/IGTK update(s), according to some aspects of the disclosure.

FIG. 8 illustrates exemplary communications between AP MLD 802 and non-AP MLD 804 to communicate keep-alive message(s) and GTK/IGTK update(s), according to some aspects of the disclosure. Compared to FIG. 6, FIG. 8 illustrates two APs 810*b* and 810*c* of AP MLD 802 and two STAs 826*b* and 826*c* (virtual STA) of non-AP MLD 804. However, AP MLD 802 can include one or more other APs (for example, as illustrated in FIG. 6) and non-AP MLD 804 can include one or more other STAs (for example, as illustrated in FIG. 6) and the aspects of the disclosure discussed with respect to FIG. 8 can be applied to all APs of AP MLD 802 and/or all STAs of non-AP MLD 804. In the example of FIG. 8, STA 826*b* is in an awake mode where STA 826*b* is configured to track DTIM Beacons, to send keep-alive message(s), and/or to receive updated GTK/IGTK. In this example, virtual STA 826*c* is in the hibernation mode. According to some examples, all TIDs (e.g., DL TIDs) are mapped to all the links in AP MLD 802 and/or all TIDs (e.g. UL TIDs) are mapped to all the links in non-AP MLD 804.

According to some aspects, AP MLD 802 can specify different idle periods such as, but not limited to, BSS Max Idle Periods, for different links, STAs, APs, and/or BSSs. In some examples, BSS Max Idle Period is a maximum time that a STA can be idle (for example, AP does not receive any frames from that STA) before the AP disassociates the STA. For example, AM MLD 802 can identify a first BSS Max Idle Period for AP 810*b*, link 806*b*, and STA 826*b* and can identify a second BSS Max Idle Period for AP 810*c*, link 806*c*, and STA 826*c*. In some examples, the first and second BSS Max Idle Periods are different from each other. However, the aspects of this disclosure are not limited to this example, and the first and second BSS Max Idle Periods can be the same.

Non-AP MLD 804 can send keep-alive message(s) 801 to AP MLD 802 to meet the BSS Max Idle Period. In some examples, the association between AP MLD 802 and non-AP MLD 804 is at the device level and non-AP MLD 804 is to meet the keep-alive transmission requirement on at least one of the links in order to maintain the ML association with AP MLD 802. According to some aspects, since STA 826*c* is in the hibernation mode, STA 826*b* is configured to transmit the keep-alive message(s) 801 on link 806*b*. In some examples, STA 826*b* sends the keep-alive message(s) 801 on link 806*b* within the minimum (e.g., the shorter) of the first and second BSS Max Idle Periods identified by AP MLD 802 to maintain the association. Alternatively, STA 826*b* sends the keep-alive message(s) 801 on link 806*b* within the maximum of the first and second BSS Max Idle Periods identified by AP MLD 802 to maintain the association.

According to some aspects, Group Temporal Key (GTK) can be used by STAs to decrypt multicast and/or broadcast traffic from, for example, APs. Integrity GTK (IGTK) can also be used check the integrity of the multicast and/or broadcast traffic from, for example, APs. In some examples, GTK and/or IGTK can be provide to the STAs during a handshake process (e.g., handshake 716 and/or handshake 731 of FIG. 7.) In some examples, GTK and/or IGTK may need to be updated due to, for example, the expiration of one or more timers, or when one STA or multiple STAs have disassociated from an AP. According to some examples, each AP 810*b* and 810*c* can have its GTK/IGTK and/or its updated GTK/IGTK different from other APs. Alternatively, two or more APs of AP MLD 802 can share GTK/IGTK and/or updated GTK/IGTK.

According to some aspects, when one AP of AP MLD 802 is to update its GTK/IGTK, AP MLD 802 may convey the new/updated GTK/IGTK to any available STA of associated non-AP MLD 804, which may operate on a different link from the AP that updates its GTK/IGTK. For example, when AP 810*c* updates its GTK/IGTK, AP 810*c* does not directly transmit the updated GTK/IGTK through link 806*c* since STA 826*c* is in the hibernation mode. In this example, AP 810*c* conveys its updated GTK/IGTK 803 to AP 810*b*. AP 810*b* can send the updated GTK/IGTK 803 through link 806*b* to STA 826*b*. After receiving the updated GTK/IGTK, non-AP MLD 806 can update the GTK/IGTK for STA 826*c*.

Although some examples are discussed with respect to updated GTK/IGTK, the aspects of this disclosure are not limited to these examples. The cross-link update discussed with respect to updated GTK/IGTK can also be applied to other BSS operation parameter updates that are unicast transmitted from an AP to each associated STA.

Figures 9A, 9B:
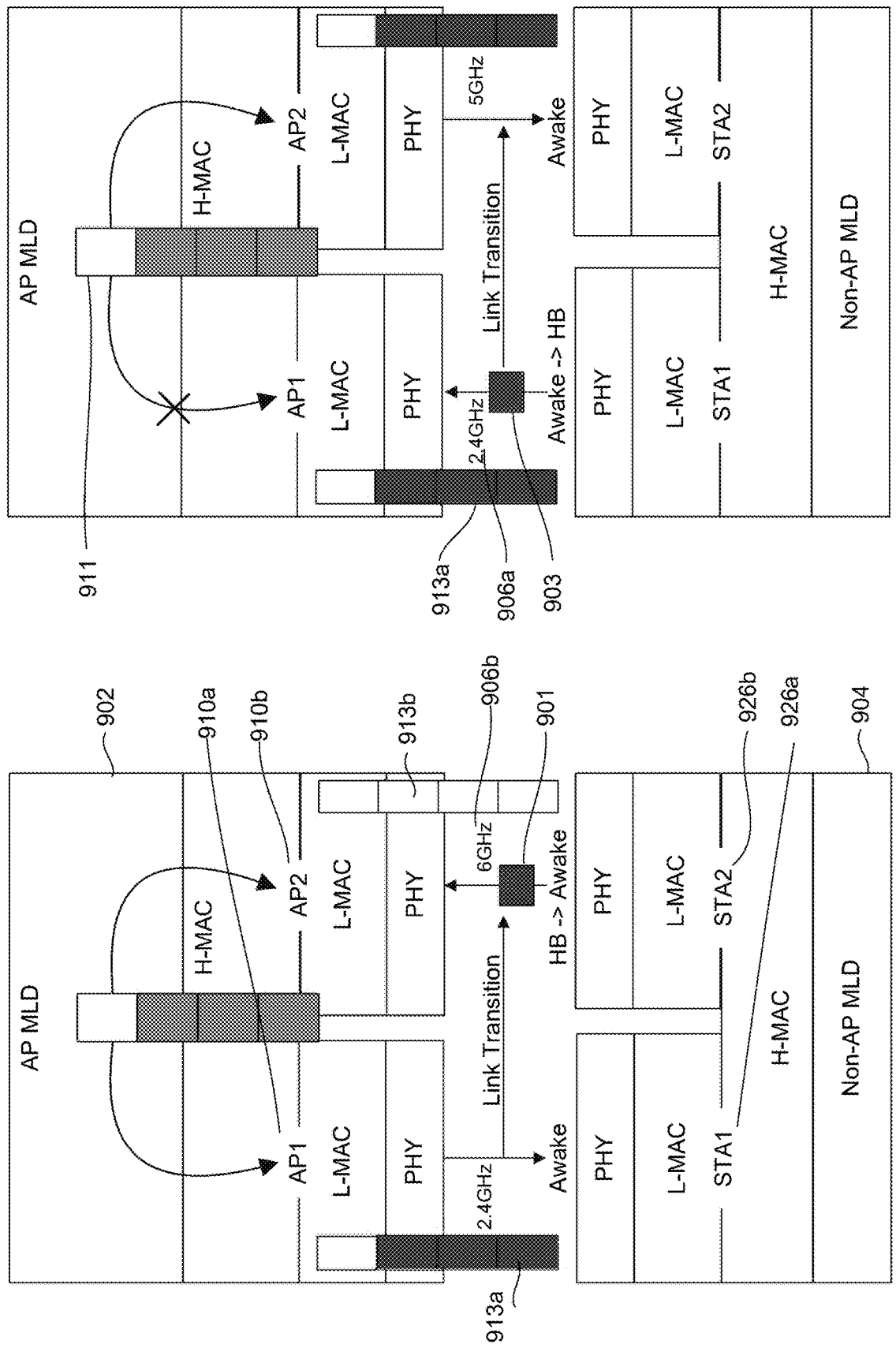
FIGS. 9A and 9B illustrate exemplary communications between an AP MLD and a non-AP MLD to enter and/or exit the hibernation mode during a link transition, according to some aspects of this disclosure.

FIGS. 9A and 9B illustrate exemplary communications between AP MLD 902 and non-AP MLD 904 to enter and/or exit the hibernation mode during a link transition, according to some aspects of the disclosure. Compared to FIG. 6, FIG. 9 illustrates two APs 910*a* and 910*b* of AP MLD 902 and two STAs 926*a* and 926*b* of non-AP MLD 904. However, AP MLD 902 can include one or more APs (for example, as illustrated in FIG. 6) and non-AP MLD 904 can include one or more STAs (for example, as illustrated in FIG. 6) and the aspects of the disclosure discussed with respect to FIG. 9 can be applied to all APs of AP MLD 902 and/or all STAs of non-AP MLD 904. In the example of FIG. 9A, STA 926*a* is in an awake mode where STA 926*a* is configured to track DTIM Beacons, to send keep-alive message(s), and/or to receive updated GTK/IGTK. In this example, STA 926*b* is in the hibernation mode. According to some examples, all TIDs (e.g., DL TIDs) are mapped to all the links in AP MLD 902 and/or all TIDs (e.g. UL TIDs) are mapped to all the links in non-AP MLD 904.

According to some examples, non-AP MLD 904 can change the link non-AP MLD 904 uses to communicate with AP MLD 902. As a non-limiting example, as illustrated in FIGS. 9A and 9B, non-AP MLD 904 can first communicate with AP MLD 902 using link 906a (e.g., the 2.4 GHz link) since, for example, link 906a has a longer range. In this non-limiting example, when non-AP MLD 904 gets closer to AP MLD 902, non-AP MLD 904 can decide to transition to link 906b (e.g., the 5 GHz link) since, for example, link 906b has better quality. In this example, non-AP MLD 904 (using, for example, one or more processors) can control its STAs to transition STA 926a from the awake mode to the hibernation mode and to transition STA 926b from the hibernation mode to the awake mode. In this example, STA 926a has its associated transceiver/radio (e.g., transceiver 220a of FIG. 2) and STA 926b has its associated transceiver/radio (e.g., transceiver 220b of FIG. 2) different from STA 926a.

FIGS. 9A and 9B illustrate one exemplary operation where STA 926a transitions from the awake mode to the hibernation mode and STA 926b transitions from the hibernation mode to the awake mode. As illustrated in FIG. 9A, AP 910a is communicating with STA 926a using link 906a. In this example, buffer 913a (for example in the lower MAC layer of AP 910a) includes data (e.g., packets, frames, etc.) to be sent to STA 926a. In this example, buffer 913b (for example in the lower MAC layer of AP 910b) does not include any data since STA 926b is in the hibernation mode.

According to some examples, as one exemplary step in the link transition (e.g., a first step in the link transition and/or before the link transition), STA 926b can transition from the hibernation mode to the awake mode and transmit a frame 901 such as, but not limited to, PS-Poll frame and/or U-APSD Trigger frame to AP 910b to indicate that STA 926b has exited the hibernation mode.

According to some examples, as another exemplary step in the link transition, and after receiving frame 901, AP MLD 902 can stop buffering new data in, for example, buffer 913a, as illustrated in FIG. 9B. In this example, AP MLD 902 can stop moving new packets from buffer 911 to buffer 913a. As another exemplary step, AP MLD 902 using AP 910a can clear buffered data in buffer 913a, as illustrated in FIG. 9B. For example, AP 910a can complete transmission of buffered data using AP 910a and link 906a until no more data is in buffer 913a (e.g., More Data=0).

As illustrated in FIG. 9B, STA 926b has transitioned to the awake mode and as another exemplary step in the link transition, STA 926a is transitioning to the hibernation mode. In some examples, before transitioning to the hibernation mode, STA 926a can send a message and/or a frame 903 to AP 910a to indicate that STA 926a is transitioning to the hibernation mode. In some examples, STA 926a can use an A-Control field in a MAC header of frame 903 to indicate that STA 926a is transitioning to the hibernation mode. However, the aspects of this disclosure are not limited to this example and frame 903 can include other information to indicate that the STA is transitioning to the hibernation mode. According to some examples, as another exemplary step in the link transition, and after receiving frame 903, AP MLD 902 can stop buffering new data in, for example, buffer 913a, as illustrated in FIG. 9B. In this example, AP MLD 902 can stop moving new packets from buffer 911 to buffer 913a. As another exemplary step, AP MLD 902 using AP 910a can clear buffered data in buffer 913a, as illustrated in FIG. 9B. For example, AP 910a can complete transmission of buffered data using AP 910a and link 906a until no more data is in buffer 913a (e.g., More Data=0).

Figure 10:
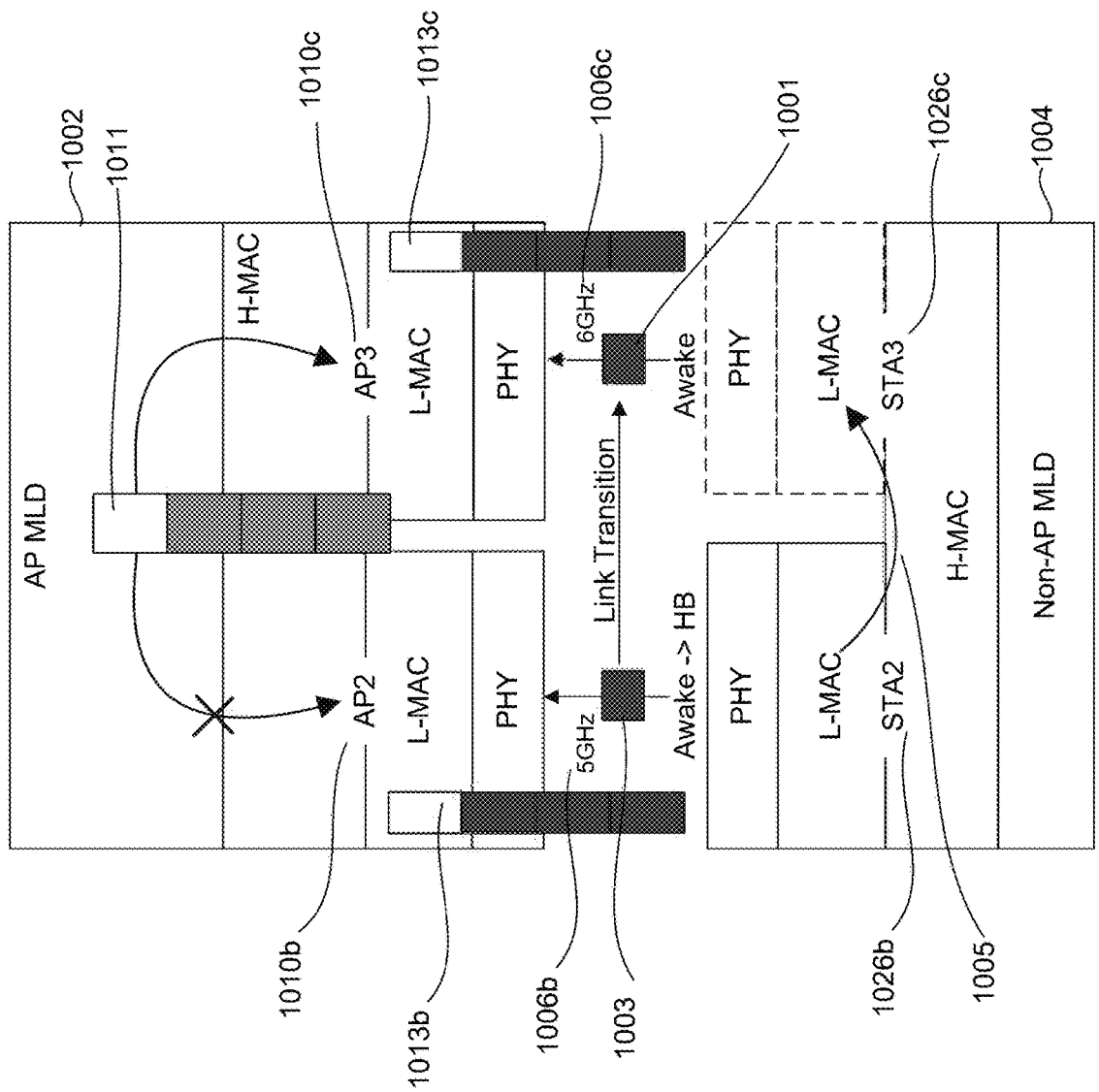
FIG. 10 illustrates exemplary communications between an AP MLD and a non-AP MLD to enter and/or exit the hibernation mode during a link transition, according to some aspects of the disclosure.

FIG. 10 illustrates exemplary communications between AP MLD 1002 and non-AP MLD 1004 to enter and/or exit the hibernation mode during a link transition, according to some aspects of the disclosure. Compared to FIG. 6, FIG. 10 illustrates two APs 1010b and 1010c of AP MLD 1002 and two STAs 1026b and 1026c (virtual STA) of non-AP MLD 1004. However, AP MLD 1002 can include one or more APs (for example, as illustrated in FIG. 6) and non-AP MLD 1004 can include one or more STAs (for example, as illustrated in FIG. 6) and the aspects of the disclosure discussed with respect to FIG. 10 can be applied to all APs of AP MLD 1002 and/or all STAs of non-AP MLD 1004. In the example of FIG. 10, STA 1026b is in an awake mode where STA 1026b is configured to track DTIM Beacons, to send keep-alive message(s), and/or to receive updated GTK/IGTK. In this example, virtual STA 1026c is in the hibernation mode. According to some examples, all TIDs (e.g., DL TIDs) are mapped to all the links in AP MLD 1002 and/or all TIDs (e.g. UL TIDs) are mapped to all the links in non-AP MLD 1004.

According to some examples, non-AP MLD 1004 can change the link non-AP MLD 1004 uses to communicate with AP MLD 1002. As a non-limiting example, as illustrated in FIG. 10, non-AP MLD 1004 can first communicate with AP MLD 1002 using link 1006b (e.g., the 5 GHz link). In this non-limiting example, non-AP MLD 1004 can decide to transition to link 1006c (e.g., the 6 GHz link) since, for example, link 1006c has better quality. In this example, non-AP MLD 1004 (using, for example, one or more processors) can control its STAs to transition STA 1026b from the awake mode to the hibernation mode and to transition virtual STA 1026c from the hibernation mode to the awake mode. In this example, STAs 1026b and 1026c can share the same transceiver/radio (e.g., transceiver 220b of FIG. 2) and non-AP MLD 1004 (using, for example, one or more processors) can control the shared transceiver to operate at the frequency of the second link (e.g., link 1006c) instead of operating at the frequency of the first link (e.g., link 1006b).

FIG. 10 illustrates one exemplary operation where STA 1026b transitions from the awake mode to the hibernation mode and virtual STA 1026c transitions from the hibernation mode to the awake mode. As illustrated in FIG. 10, AP 1010b is communicating with STA 1026b using link 1006b. In this example, buffer 1013b (for example in the lower MAC layer of AP 1010b) includes data (e.g., packets, frames, etc.) to be sent to STA 1026b. According to some examples, as one exemplary step in the link transition (e.g., as a first step in the link transition and/or before the link transition), STA 1026b is transitioning from the awake mode to the hibernation mode. In some examples, before transitioning to the hibernation mode, STA 1026b can send a message and/or a frame 1003 to AP 1010b to indicate that STA 1026b is transitioning and/or has transitioned to the hibernation mode. In some examples, STA 1026b can use an A-Control field in a MAC header of frame 1003 to indicate that STA 1026b is transitioning to the hibernation mode. However, the aspects of this disclosure are not limited to this example and frame 1003 can include other information to indicate that the STA is transitioning to the hibernation mode.

According to some examples, as another exemplary step in the link transition, and after receiving frame 1003, AP MLD 1002 can stop buffering new data in, for example, buffer 1013b. In this example, AP MLD 1002 can stop moving new packets from buffer 1011 to buffer 1013b. As another exemplary step, AP MLD 1002 using AP 1010b can clear buffered data in buffer 1013b. For example, AP 1010b can complete transmission of buffered data using AP 1010a and link 1006b until no more data is in buffer 1013b (e.g., More Data=0).

According to some examples, as another exemplary step in the link transition (e.g., a second step in the link transition), non-AP MLD 1004 can switch the transceivers/radios from STA 1026b to STA 1026c. According to some aspects of the disclosure, the switching from STA 1026b to STA 1026c can include using a transceiver (e.g., transceiver 220c of FIG. 2) associated with link 1006c instead of the transceiver (e.g., transceiver 220b of FIG. 2) associated with link 1006b. Additionally, or alternatively, the switching from STA 1026b to STA 1026c can include controlling a single transceiver (e.g., transceiver 220) to operate at the frequency of link 1006c instead of operating at the frequency of link 1006b.

According to some examples, as another exemplary step in the link transition (e.g., a third step in the link transition), STA 1026c can transition from the hibernation mode to the awake mode and transmit a frame 1001 such as, but not limited to, PS-Poll frame and/or U-APSD Trigger frame to AP 1010c to indicate that STA 1026c has exited the hibernation mode. In some examples, AP MLD 1002 can move the new packets from buffer 1011 to buffer 1013c of AP 1010c (e.g., in the lower MAC layer of AP 1010c) after receiving frame 1001. Alternatively, AP MLD 1002 can move the new packets from buffer 1011 to buffer 1013c of AP 1010c after receiving frame 1003 but before receiving frame 1001.

Figure 11:
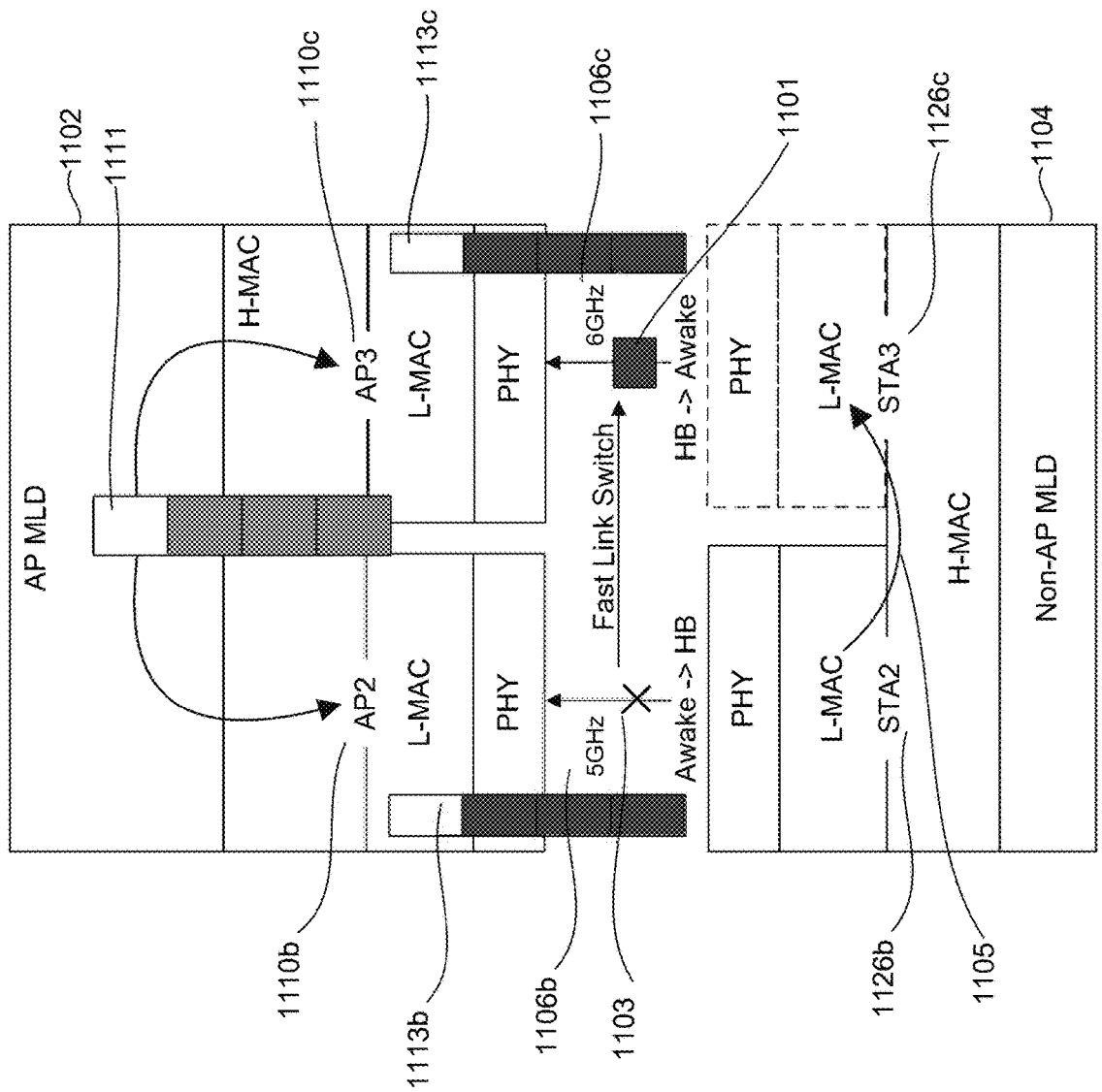
FIG. 11 illustrates exemplary communications between an AP MLD and a non-AP MLD to enter and/or exit the hibernation mode during a fast link switch, according to some aspects of the disclosure.

FIG. 11 illustrates exemplary communications between AP MLD 1102 and non-AP MLD 1104 to enter and/or exit the hibernation mode during a fast link switch, according to some aspects of the disclosure. Compared to FIG. 6, FIG. 11 illustrates two APs 1110b and 1110c of AP MLD 1102 and two STAs 1126b and 1126c (virtual STA) of non-AP MLD 1104. However, AP MLD 1102 can include one or more APs (for example, as illustrated in FIG. 6) and non-AP MLD 1104 can include one or more STAs (for example, as illustrated in FIG. 6) and the aspects of the disclosure discussed with respect to FIG. 11 can be applied to all APs of AP MLD 1102 and/or all STAs of non-AP MLD 1104. In the example of FIG. 11, STA 1126b is in an awake mode where STA 1126b is configured to track DTIM Beacons, to send keep-alive message(s), and/or to receive updated GTK/IGTK. In this example, virtual STA 1126c is in the hibernation mode. According to some examples, all TIDs (e.g., DL TIDs) are mapped to all the links in AP MLD 1102 and/or all TIDs (e.g., UL TIDs) are mapped to all the links in non-AP MLD 1104.

FIG. 11 illustrates one exemplary operation where STA 1126b transitions from the awake mode to the hibernation mode and STA 1126c transitions from the hibernation mode to the awake mode. In this exemplary aspect, the transition between links 1106b and 1106c is a fast link switch. According to some examples, in the link transition discussed above with respect to FIGS. 9A, 9B, and 10, the old link (the link from which the transition occurs) can still be used to convey left over data (e.g., data already buffered for transmission or re-transmission from the old link). According to some examples, in the fast link switch as will be discussed with respect to FIGS. 11 and 12, the old link (the link from which the transition occurs) may become immediately unavailable. For example, the connection on the old link is broken, the error and/or interferences on the old link becomes more than an acceptable threshold, etc. In some examples, the unavailability of the old link can last for a long period (e.g., longer than a threshold period), which may result in unbearable delay for low latency traffic. As discussed in more detail below with respect to FIGS. 11 and 12, when the old link becomes unavailable, non-AP MLD 1104 can quickly notify AP MLD 1102 to stop buffering new data for the old link, to stop transmission on the old link, to move the left over data (e.g., buffered data for transmission or re-transmission on the old link) from the old link to the new link(s) or to re-buffer the left over data from host or higher MAC to the new link(s), and/or start transmission from the new link(s).

As illustrated in FIG. 11, AP 1110b is communicating with STA 1126b using link 1106b. In this example, buffer 1113b (for example in the lower MAC layer of AP 1110b) includes data (e.g., packets, frames, etc.) to be sent to STA 1126b. According to some examples, link 1106b becomes immediately unavailable at 1103 (e.g., the connection on link 1106b is broken, the error and/or interferences on link 1106b becomes more than an acceptable threshold, etc.) In some examples, STA 1126b can transition from the awake mode to the hibernation mode.

According to some examples, as an exemplary step in the fast link switch, non-AP MLD 1104 can switch the transceivers/radios from STA 1126b to STA 1126c. According to some aspects of the disclosure, the switching from STA 1126b to STA 1126c can include using a transceiver (e.g., transceiver 220c of FIG. 2) associated with link 1106c instead of the transceiver (e.g., transceiver 220b of FIG. 2) associated with link 1106b. Additionally, or alternatively, the switching from STA 1126b to STA 1126c can include controlling a single transceiver (e.g., transceiver 220) to operate at the frequency of link 1106c instead of operating at the frequency of link 1106b.

According to some examples, as another exemplary step in the fast link switch, STA 1126c can transition from the hibernation mode to the awake mode and transmit a frame 1101 to AP 1110c to indicate that STA 1126c has exited the hibernation mode. In some examples, frame 1101 can include, but not limited to, PS-Poll frame and/or U-APSD Trigger frame. In some examples, STA 1126b can use an A-Control field in a MAC header of frame 1101 to indicate that STA 1126b is transitioning and/or has transitioned to the awake mode.

According to some aspects, after receiving frame 1101, AP MLD 1102 can stop buffering new data in, for example, buffer 1113b. In this example, AP MLD 1102 can stop moving new packets from buffer 1111 to buffer 1113b. Additionally, or alternatively, AP MLD 1102 can stop using AP 1110b for transmitting data on link 1106b. Additionally, or alternatively, AP MLD 1102 can move the left over data (e.g., buffered data for transmission or re-transmission in buffer 1113b) from buffer 1113b to buffer 1113c (and/or other buffer(s) of other the new link(s)). AP MLD 1102 can also re-buffer the left over data from buffer 1113b to buffer 1113c. AP MLD 1102 can start using AP 1110c and link 1106c for transmitting the left over data and/or new data to STA 1126c of non-AP MLD 1104.

Figure 12:
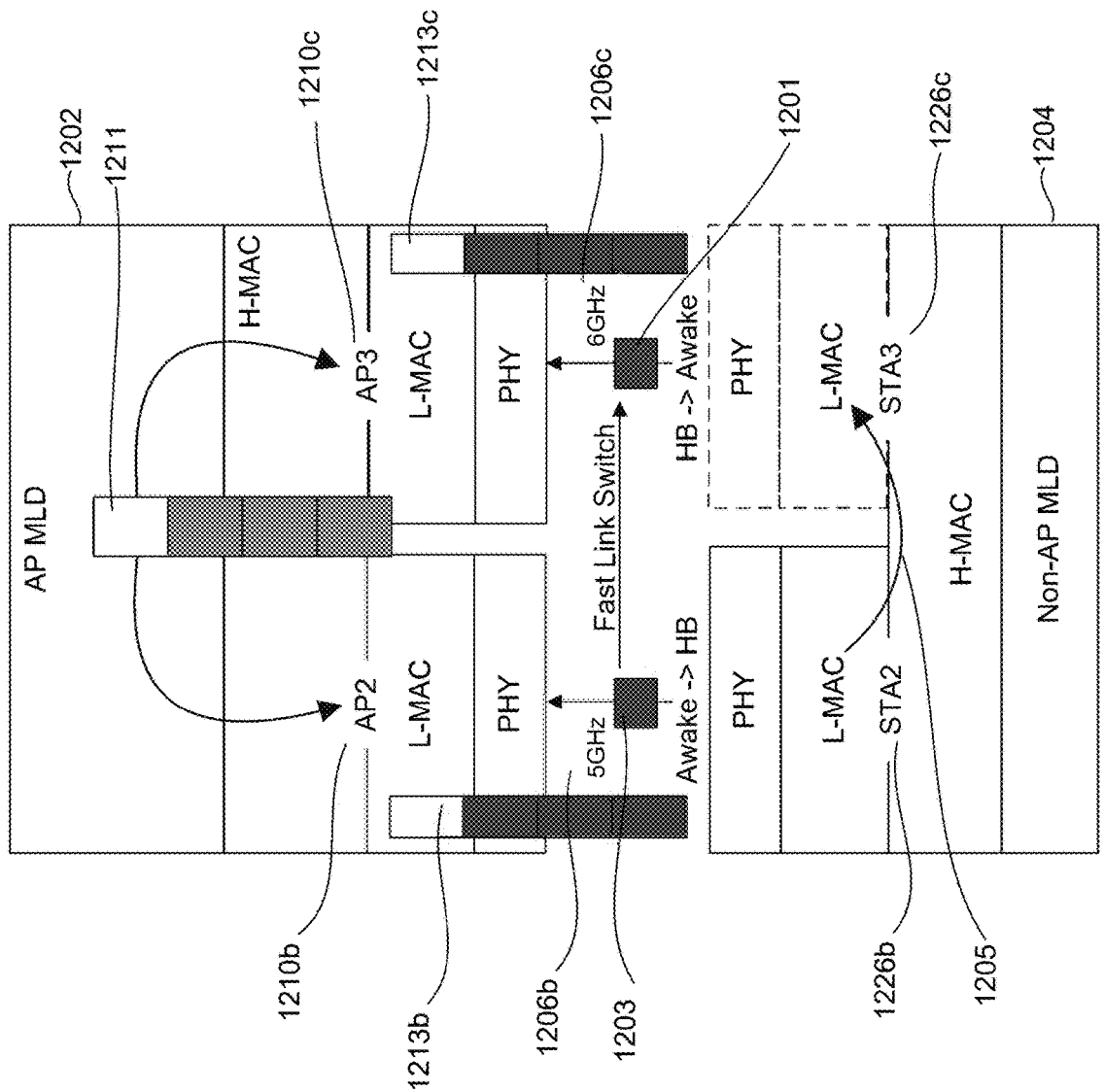
FIG. 12 illustrates exemplary communications between an AP MLD and non-AP MLD to enter and/or exit the hibernation mode during a fast link switch, according to some aspects of the disclosure.

FIG. 12 illustrates exemplary communications between AP MLD 1202 and non-AP MLD 1204 to enter and/or exit the hibernation mode during a fast link switch, according to some aspects of the disclosure. Compared to FIG. 6, FIG. 12 illustrates two APs 1210b and 1210c of AP MLD 1202 and two STAs 1226b and 1226c (virtual STA) of non-AP MLD 1204. However, AP MLD 1202 can include one or more other APs (for example, as illustrated in FIG. 6 for example) and non-AP MLD 1204 can include one or more other STAs (for example, as illustrated in FIG. 6) and the aspects of the disclosure discussed with respect to FIG. 12 can be applied to all APs of AP MLD 1202 and/or all STAs of non-AP MLD 1204. In the example of FIG. 12, STA 1226b is in an awake mode where STA 1226b is configured to track DTIM Beacons, to send keep-alive message(s), and/or to receive updated GTK/IGTK. In this example, virtual STA 1226c is in the hibernation mode. According to some examples, all TIDs (e.g., DL TIDs) are mapped to all the links in AP MLD 1202 and/or all TIDs (e.g., UL TIDs) are mapped to all the links in non-AP MLD 1204.

FIG. 12 illustrates one exemplary operation where STA 1226b transitions from the awake mode to the hibernation mode and STA 1226c transitions from the hibernation mode to the awake mode. In this exemplary aspect, the transition between links 1206b and 1206c is a fast link switch.

As illustrated in FIG. 12, AP 1210b is communicating with STA 1226b using link 1206b. In this example, buffer 1213b (for example in the lower MAC layer of AP 1210b) includes data (e.g., packets, frames, etc.) to be sent to STA 1226b. According to some examples, link 1206b becomes unavailable (e.g., the connection on link 1106b is broken, the error and/or interferences on link 1206b becomes more than an acceptable threshold, etc.) but link 1206b is still available for a short time. In some examples, the short time can include a time to transmit one short frame. In the exemplary aspect of FIG. 12, before STA 1226b transitions from the awake mode to the hibernation mode and before link 1206b becomes unavailable, STA 1226b transmits a frame 1203 to AP 1210b. In some examples, STA 1226b can use an A-Control field in a MAC header of frame 1203 to indicate that STA 1226b is transitioning to the awake mode and/or that the fast link switching is occurring. For example, STA 1226b can use an A-Control field in a MAC header of frame 1203 to indicate to AP 1210b that a fast link switch between links 1206b and 1206c is occurring. However, the aspects of this disclosure are not limited to this example and frame 1203 can include other information to indicate that the STA is transitioning to the hibernation mode.

According to some aspects, after receiving frame 1203, AP MLD 1202 can stop buffering new data in, for example, buffer 1213b. In this example, AP MLD 1202 can stop moving new packets from buffer 1211 to buffer 1213b. Additionally, or alternatively, AP MLD 1202 can stop using AP 1210b for transmitting data on link 1206b. Additionally, or alternatively, AP MLD 1202 can move the left over data (e.g., buffered data for transmission or re-transmission in buffer 1213b) from buffer 1213b to buffer 1213c (and/or other buffer(s) of other the new link(s)). AP MLD 1202 can also re-buffer the left over data from buffer 1213b to buffer 1213c.

According to some aspects, as an exemplary step in the fast link switch, non-AP MLD 1204 can switch the transceivers/radios from STA 1226b to STA 1226c. According to some aspects of the disclosure, the switching from STA 1226b to STA 1226c can include using a transceiver (e.g., transceiver 220c of FIG. 2) associated with link 1206c instead of the transceiver (e.g., transceiver 220b of FIG. 2) associated with link 1206b. Additionally, or alternatively, the switching from STA 1226b to STA 1226c can include controlling a single transceiver (e.g., transceiver 220) to operate at the frequency of link 1206c instead of operating at the frequency of link 1206b.

According to some examples, as another exemplary step in the fast link switch, STA 1226c can transition from the hibernation mode to the awake mode and transmit a frame 1201 to AP 1210c to indicate that STA 1226c has exited the hibernation mode. In some examples, frame 1201 can include, but not limited to, PS-Poll frame and/or U-APSD Trigger frame to indicate that STA 1226b is transitioning and/or has transitioned to the awake mode.

According to some aspects, after receiving frame 1201, AP MLD 1202 can start using AP 1210c and link 1206c for transmitting the left over data and/or new data to STA 1226c of non-AP MLD 1204.

Figure 13:
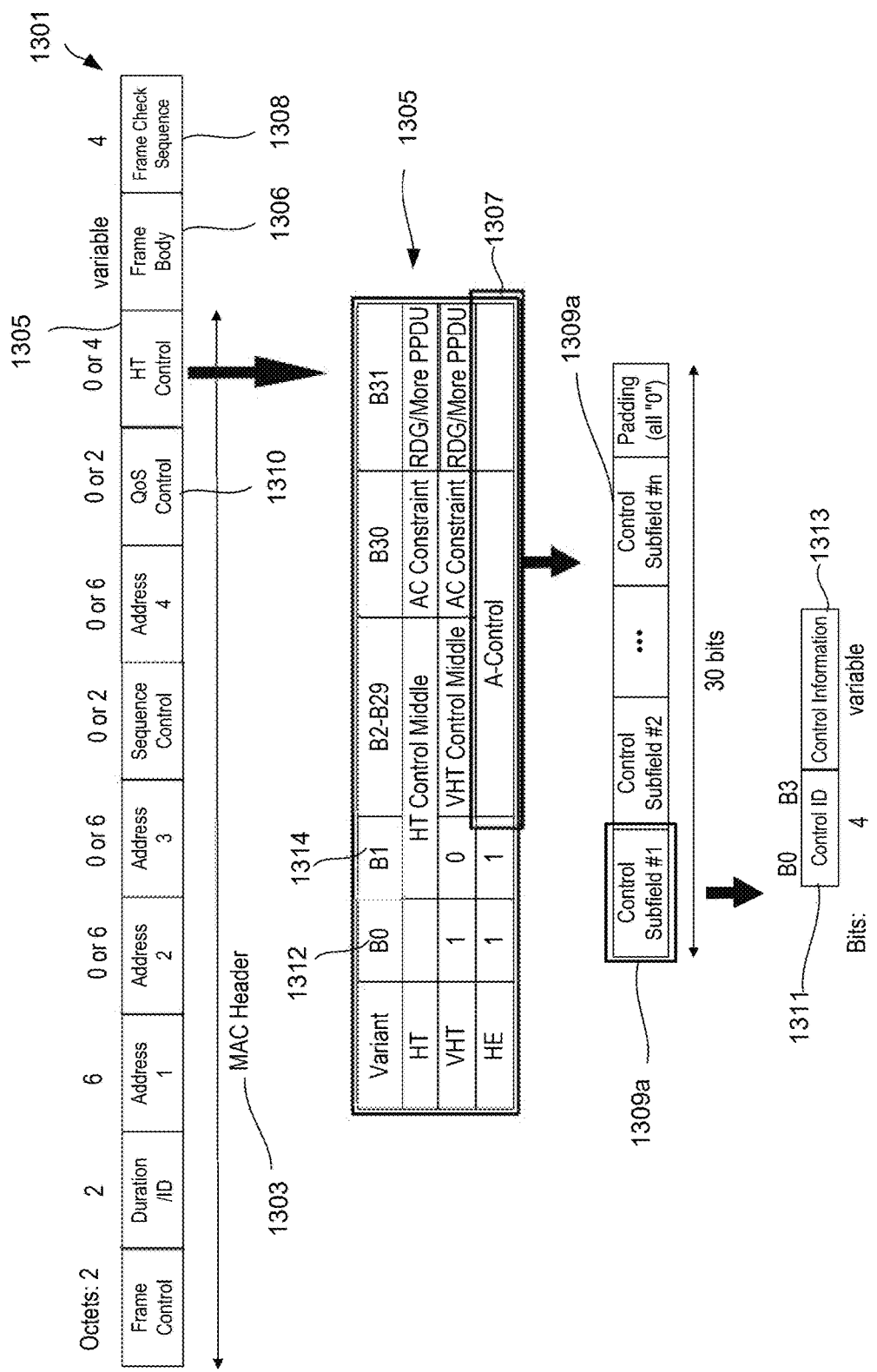
FIG. 13 illustrates an example frame format, which can be communicated between an AP MLD and a non-AP MLD to communicate that a STA is entering (or has exited) the hibernation mode, according to some aspects of the disclosure.

FIG. 13 illustrates an example frame format, which can be communicated between an AP MLD and a non-AP MLD to communicate that a STA is entering (or has exited) the hibernation mode, according to some aspects of the disclosure. For example, FIG. 13 illustrates an exemplary format of frame 1301. The exemplary format of frame 1301 can be the exemplary format of one or more of frames 903, 1003, 1101, and/or 1203. According to some aspects, frame 1301 can include MAC header 1303, frame body (e.g., MAC service data unit (MSDU) and/or aggregated MSDU (A-MDSU)) 1306, and Frame Check Sequence (FCS—for, for example, error-detection and/or additional padding) 1308. It is noted that the length information provided for each field and/or subfield of frame 1301 is exemplary length information and the aspects of this disclosure are not limited to these examples.

In some examples, MAC header 1303 can include fields such as, but not limited to, frame control, duration field, address(es) (e.g., one or more source addresses, one or more destination addresses, etc.), sequence control, quality of service (QoS) control, and HT control 1305 as understood by a person of ordinary skill in art. In the aspects of this disclosure, one or more fields of the MAC header 1303 (such as, but not limited to, HT control field 1305) can be used to communicate to an AP MLD that a STA of a non-AP MLD is entering (or has exited) the hibernation mode.

In some examples, MAC header 1303 can also include QoS control field 1310. QoS control field 1310 can include a field indicating the traffic identifier (TID). In a non-limiting example, the TID field of QoS control field 1310 can include four bits. The TID can indicate the stream of frames to which frame 1301 (and/or frame body 1306) belongs.

An example format of HT control field 1305 can include two bits VHT (Very High Throughput) 1312 and HE (High Efficiency) 1314. Depending on the values of these two bits, a receiver device that receives HT control field 1305 (e.g., an AP MLD) can determine the purpose and format of HT control field 1305 and decode HT control field 1305 accordingly. For example, if the value of VHT 1312 bit is "0", HT control field 1305 is an HT (High Throughput) variant. If the value of VHT 1312 bit is "1" and the value of HE 1314 bit is "0", HT control field 1305 is a VHT (Very High Throughput) variant. If the value of VHT 1312 bit is "1" and the value of HE 1314 bit is "1", HT control field 1305 is an HE (High Efficiency) variant.

According to some aspects, when a receiver device (e.g., AP MLD) receives the frame 1301 having MAC header 1303 including HT control field 1305 with the value of VHT 1312 bit being "1" and the value of HE 1314 bit being "1", the receiver device knows that the rest of HT control field 1305 is A-control field 1307. Therefore, the receiver device can decode A-control field 1307 accordingly. In some examples, A-control field 1307 can include 30 bits. But the aspects of this disclosure are not limited to this example.

In some aspects, A-control field 1307 can include different control subfields 1309a-1309n and a padding field. In some examples, control subfields 1309a-1309n can each have variable sizes. The padding subfield can have 0 or more bits. The non-AP MLD can be configured to use one or more control subfields 1309 to communicate that a STA of the non-AP MLD is entering (or has exited) the hibernation mode, according to some aspects.

Figure 14:
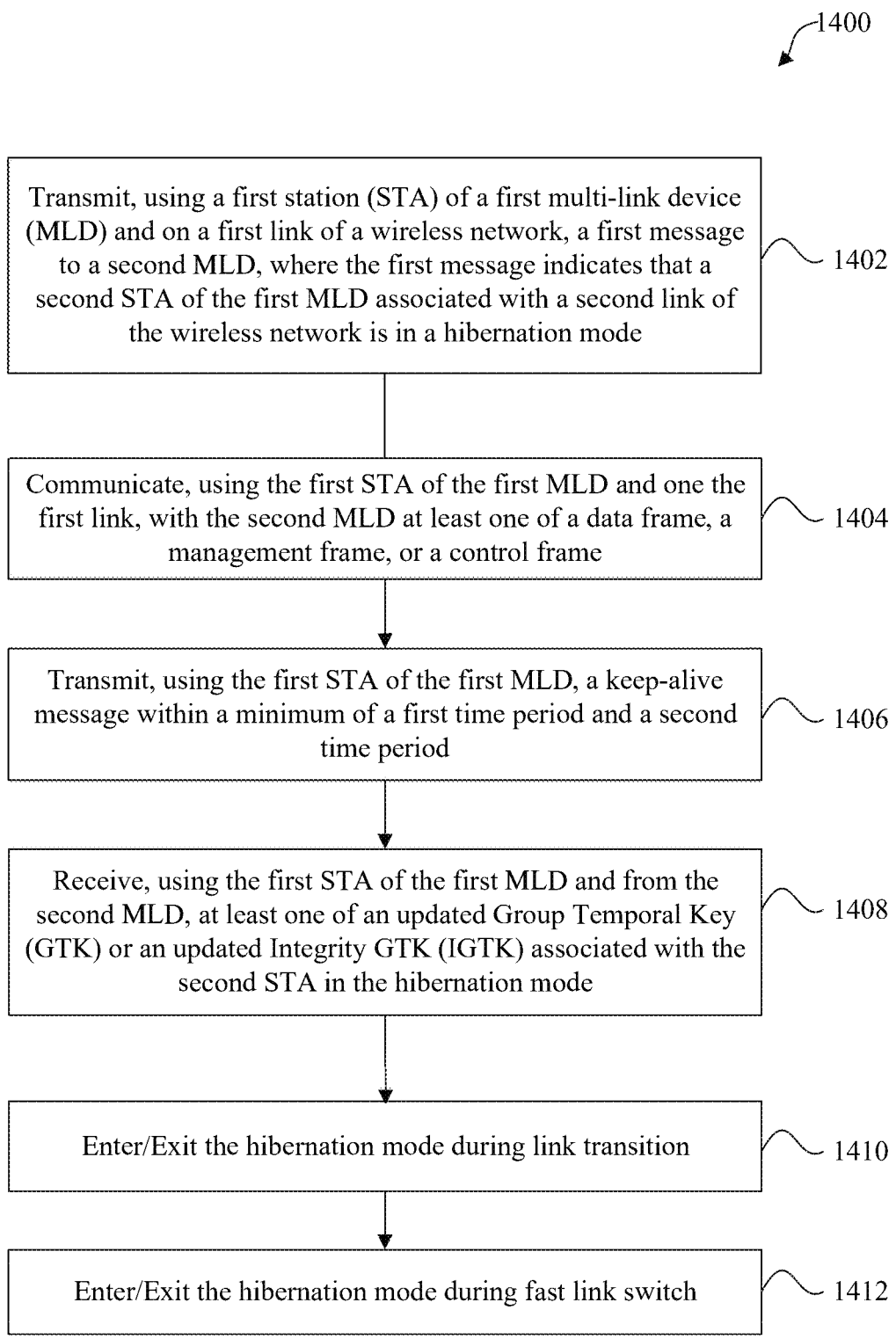
FIG. 14 illustrates an example method for a wireless system supporting and implementing a hibernation mode for multi-link wireless communication networks such as a wireless local area network (WLAN), according to some aspects of the disclosure.

For example, a control subfield 1309*a* of A-control field 1307 can include one or more of control identifier (ID) 1311 and control information 1313. According to some aspects, control ID 1311 is set to a value not used for other purposes to communicate that a STA of the non-AP MLD is entering (or has exited) the hibernation mode. In some examples, a value of "1" for control ID 1311 can signal an operating mode of a STA of the non-AP MLD. In some examples, values of 7-14 for control ID 1311 are reserved. In some aspects, one or more these values can be used to communicate to the AP-MLD that a STA of the non-AP MLD is entering (or has exited) the hibernation mode FIG. 14 illustrates an example method 1400 for a wireless system supporting and implementing a hibernation mode for multi-link wireless communication networks such as a wireless local area network (WLAN), according to some aspects of the disclosure. As a convenience and not a limitation, FIG. 14 may be described with regard to elements of FIGS. 1-13. Method 1400 may represent the operation of an electronic device (e.g., an AP MLD and/or a non-AP MLD as discussed in this disclosure) implementing a hibernation mode for multi-link wireless communication networks. Method 1400 may also be performed by system 200 of FIG. 2 and/or computer system 1500 of FIG. 15. But method 1400 is not limited to the specific aspects depicted in those figures and other systems may be used to perform the method as will be understood by those skilled in the art. It is to be appreciated that not all operations may be needed, and the operations may not be performed in the same order as shown in FIG. 14.

At 1402, a first message can be transmitted, using a first station (STA) of a first multi-link device (MLD) and on a first link of a wireless network, to a second MLD. According to some examples, the first message can indicate that a second STA of the first MLD associated with a second link of the wireless network is in a hibernation mode. For example, the first MLD can include a non-AP MLD communicating with an AP MLD during, for example, an association operation that a second STA of the non-AP MLD is in the hibernation mode. According to some examples, the non-AP MLD can include one or more processors communicatively coupled to the first and second STAs and configured to control an operation of the first and second STA. In some examples, the one or more processors are configured to transmit, using the first STA, the message to the second MLD.

In some examples, the message can include an association request transmitted during the association of the first MLD and the second MLD. Additionally, the message can further include a request to map one or more traffic identifiers (TIDs) at the second MLD to the first and second links.

After the first and second MLDs are associated, the first and second MLDs can communicate at least one of a data frame, a management frame, or a control frame. For example, at 1404, the first MLD communicates, using the first STA and on the first link, with the second MLD at least one of a data frame, a management frame, or a control frame.

According to some examples, the first MLD can be configured to transmit keep-alive message(s) to the second MLD as discussed above with respect to, for example, FIG. 8. For example, at 1406, a keep-alive message is transmitted (using, for example, one or more processors and using the first STA) within a minimum (e.g., the shorter) of a first time period and a second time period. In some examples, the first time period is a first idle period (e.g., a first maximum idle period) associated with the first STA and/or the first link and the second time period is a second idle period (e.g., a second maximum idle period) associated with the second STA and/or the second link.

According to some examples, the first MLD can be configured to receive at least one of an updated Group Temporal Key (GTK) or an updated Integrity GTK (IGTK) from the second MLD as discussed above with respect to, for example, FIG. 8. For example, at 1408, at least one of an updated Group Temporal Key (GTK) or an updated Integrity GTK (IGTK) associated with the second STA in the hibernation mode is received from the second MLD using, for example, one or more processors and using the first STA.

At 1410, one or more operations associated with entering and/or exiting the hibernation mode during a link transition can be performed as discussed with respect to FIGS. 9A, 9B, and 10.

In one example, 1410 can include transmitting, using the second STA and in response to the second STA transitioning to an awake mode, a frame to the second MLD indicating that the second STA has exited the hibernation mode and controlling the first STA to enter the hibernation mode. In some examples, the first STA includes a first transceiver and the second STA includes a second transceiver different from the first transceiver.

In one example, 1410 can include transmitting, using the first STA, a first frame to the second MLD indicating that the first STA is transitioning to the hibernation mode and transitioning the second STA from the hibernation mode to an awake mode. 1410 can further include transmitting, using the second STA and in response to the second STA transitioning to the awake mode, a second frame to the second MLD indicating that the second STA has exited the hibernation mode. In some examples, transitioning the second STA from the hibernation mode to the awake mode can include controlling a transceiver of the first MLD associated with the first STA and the second STA to operate at a frequency associated with the second link.

At 1412, one or more operations associated with entering and/or exiting the hibernation mode during a fast link switch can be performed as discussed with respect to FIGS. 11 and 12.

In one example, 1412 can include determining that the first link is not available (e.g., the connection on first link is broken, the error and/or interferences on the first becomes more than an acceptable threshold, etc.). In response to the determination, 1412 can further include controlling the first STA to transition from an awake mode to the hibernation mode and transitioning the second STA from the hibernation mode to the awake mode. 1412 can also include transmitting a frame, using the second STA, to the second MLD indicating that the second STA has exited the hibernation mode. In some examples, transitioning the second STA from the hibernation mode to the awake mode can include controlling a transceiver of the first MLD associated with the first STA and the second STA to operate at a frequency associated with the second link.

In one example, 1412 can include determining that the first link is not available and in response to the determination, transmitting, using the first link, a first frame to second MLD indicating that a link switch is occurring. 1412 can also include controlling the first STA to transition from an awake mode to the hibernation mode and transitioning the second STA from the hibernation mode to the awake mode. 1412 can also include transmitting a frame, using the second STA, to the second MLD indicating that the second STA has exited the hibernation mode. In some examples, transitioning the second STA from the hibernation mode to the awake mode can include controlling a transceiver of the first MLD associated with the first STA and the second STA to operate at a frequency associated with the second link.

Figure 15:
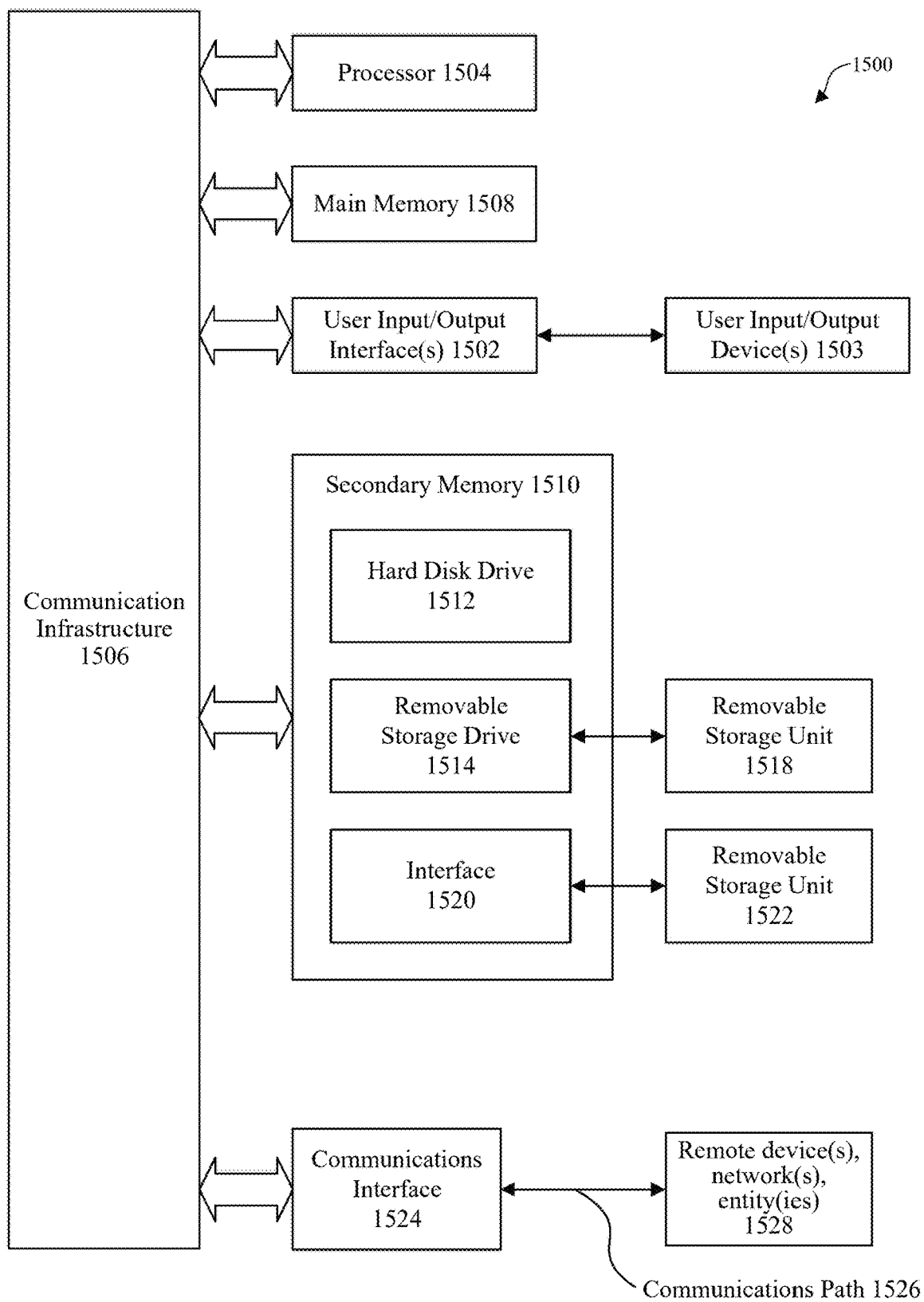
FIG. 15 is an example computer system for implementing some aspects or portion(s) thereof.

Various aspects can be implemented, for example, using one or more computer systems, such as computer system 1500 shown in FIG. 15. Computer system 1500 can be any well-known computer capable of performing the functions described herein such as devices 110, 120 of FIGS. 1A and 1B, or 200 of FIG. 2. Computer system 1500 includes one or more processors (also called central processing units, or CPUs), such as a processor 1504. Processor 1504 is connected to a communication infrastructure 1506 (e.g., a bus.) Computer system 1500 also includes user input/output device(s) 1503, such as monitors, keyboards, pointing devices, etc., that communicate with communication infrastructure 1506 through user input/output interface(s) 1502. Computer system 1500 also includes a main or primary memory 1508, such as random access memory (RAM). Main memory 1508 may include one or more levels of cache. Main memory 1508 has stored therein control logic (e.g., computer software) and/or data.

Computer system 1500 may also include one or more secondary storage devices or memory 1510. Secondary memory 1510 may include, for example, a hard disk drive 1512 and/or a removable storage device or drive 1514. Removable storage drive 1514 may be a floppy disk drive, a magnetic tape drive, a compact disk drive, an optical storage device, tape backup device, and/or any other storage device/drive.

Removable storage drive 1514 may interact with a removable storage unit 1518. Removable storage unit 1518 includes a computer usable or readable storage device having stored thereon computer software (control logic) and/or data. Removable storage unit 1518 may be a floppy disk, magnetic tape, compact disk, DVD, optical storage disk, and/any other computer data storage device. Removable storage drive 1514 reads from and/or writes to removable storage unit 1518 in a well-known manner.

According to some aspects, secondary memory 1510 may include other means, instrumentalities or other approaches for allowing computer programs and/or other instructions and/or data to be accessed by computer system 1500. Such means, instrumentalities or other approaches may include, for example, a removable storage unit 1522 and an interface 1520. Examples of the removable storage unit 1522 and the interface 1520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 may further include a communication or network interface 1524. Communication interface 1524 enables computer system 1500 to communicate and interact with any combination of remote devices, remote networks, remote entities, etc. (individually and collectively referenced by reference number 1528). For example, communication interface 1524 may allow computer system 1500 to communicate with remote devices 1528 over communications path 1526, which may be wired and/or wireless, and which may include any combination of LANs, WANs, the Internet, etc. Control logic and/or data may be transmitted to and from computer system 1500 via communication path 1526.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1500, main memory 1508, secondary memory 1510 and removable storage units 1518 and 1522, as well as tangible articles of manufacture embodying any combination of the foregoing. Such control logic, when executed by one or more data processing devices (such as computer system 1500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 15. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "some aspects," "an example," "some examples" or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

As described above, aspects of the present technology may include the gathering and use of data available from various sources, e.g., to improve or enhance functionality.

The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A multi-link device (MLD), comprising:
   a first station (STA) associated with a first link of a wireless network and configured to communicate with a second MLD over the first link;
   a second STA associated with a second link of the wireless network, wherein the second STA is in a first mode; and
   one or more processors communicatively coupled to the first and second STAs and configured to:
   transmit, using the first STA on the first link, a message to the second MLD indicating that the second STA is in the first mode, wherein the message comprises an association request transmitted during an association of the MLD and the second MLD and wherein the message further comprises a request for the second MLD to map one or more traffic identifiers (TIDs) to the first and second links;
   transition the first STA from a second mode to the first mode, wherein the first mode causes the first STA to use less power than the second mode;
   transition the second STA from the first mode to the second mode; and
   transmit a frame, using the second STA, to the second MLD indicating that the second STA has exited the first mode.

2. The MLD of claim 1, wherein the one or more processors are configured to transition the first STA from the second mode to the first mode before transitioning the second STA from the first mode to the second mode.

3. The MLD of claim 2, wherein the one or more processors are further configured to transmit, using the first link, a second frame to the second MLD indicating that a link switch is occurring before transitioning the first STA from the second mode to the first mode.

4. The MLD of claim 1, wherein the one or more processors are further configured to:
   transmit, using the first link, a second frame to the second MLD indicating that the first STA is transitioning from the second mode to the first mode; and
   transition the first STA from the second mode to the first mode after transitioning the second STA from the first mode to the second mode.

5. The MLD of claim 1, wherein the one or more processors are further configured to transmit, using the first STA, a keep-alive message within a shorter of a first time period that corresponds to a first idle period associated with the first STA and a second time period that corresponds to a second idle period associated with the second STA.

6. The MLD of claim 1, wherein the one or more processors are further configured to receive, using the first STA and from the second MLD, at least one of an updated Group Temporal Key (GTK) or an updated Integrity GTK (IGTK) associated with the second STA.

7. The MLD of claim 1, wherein the one or more processors are further configured to:
in response to determining that the first link is unavailable, control the first STA to transition from the second mode to the first mode.

8. The MLD of claim 1, wherein:
when in the first mode, the second STA does not track Delivery Traffic Indication Map (DTIM) beacons, and
when in the second mode, the second STA tracks DTIM beacons.

9. The MLD of claim 1, wherein the one or more processors do not perform management handshakes to enter or exit the first mode.

10. The MLD of claim 1, wherein during an association operation, the first STA is in the second mode for the association operation while the second STA is the first mode.

11. A method, comprising:
communicating on a first link of a wireless network, using a first station (STA) of a first multi-link device (MLD), at least one of a data frame, a management frame, or a control frame with a second MLD when a second STA of the first MLD associated with a second link of the wireless network is in a first mode;
transitioning the first STA from a second mode to the first mode, wherein the first mode comprises a lower power mode than the second mode;
transitioning the second STA from the first mode to the second mode; and
transmitting a frame, using the second STA, to the second MLD indicating that the second STA has exited the first mode, wherein:
when in the first mode, the second STA does not track Delivery Traffic Indication Map (DTIM) beacons, and
when in the second mode, the second STA tracks the DTIM beacons.

12. The method of claim 11, wherein transitioning the first STA from the second mode to the first mode occurs before transitioning the second STA from the first mode to the second mode.

13. The method of claim 11, further comprising transmitting, using the first link, a second frame to the second MLD indicating that a link switch is occurring, wherein the transmitting occurs before transitioning the first STA from the second mode to the first mode.

14. The method of claim 11, wherein transitioning the first STA from the second mode to the first mode occurs after transitioning the second STA from the first mode to the second mode and the method further comprises:
transmitting, using the first link, a second frame to the second MLD indicating that the first STA is transitioning from the second mode to the first mode.

15. The method of claim 11, wherein during an association operation, the first STA is in the second mode for the association operation while the second STA is the first mode.

16. A non-transitory computer-readable medium storing instructions that, when executed by a processor of a first multi-link device (MLD), cause the first MLD to perform operations, comprising:
communicating on a first link of a wireless network, using a first station (STA) of the first MLD, at least one of a data frame, a management frame, or a control frame with a second MLD, wherein a second STA of the first MLD associated with a second link of the wireless network is in a first mode;
transitioning the first STA from a second mode to the first mode, wherein the first mode comprises a lower power mode than the second mode;
transitioning the second STA from the first mode to the second mode;
transmitting a frame, using the second STA, to the second MLD indicating that the second STA has exited the first mode; and
receiving, using the first STA and from the second MLD, at least one of an updated Group Temporal Key (GTK) or an updated Integrity GTK (IGTK) associated with the second STA.

17. The non-transitory computer-readable medium of claim 16, wherein transitioning the first STA from the second mode to the first mode occurs before transitioning the second STA from the first mode to the second mode.

18. The non-transitory computer-readable medium of claim 16, the operations further comprising transmitting, using the first link, a second frame to the second MLD indicating that a link switch is occurring, wherein the transmitting occurs before transitioning the first STA from the second mode to the first mode.

19. The non-transitory computer-readable medium of claim 16, wherein transitioning the first STA from the second mode to the first mode occurs after transitioning the second STA from the first mode to the second mode, and the operations further comprising:
transmitting, using the first link, a second frame to the second MLD indicating that the first STA is transitioning from the second mode to the first mode.

20. The non-transitory computer-readable medium of claim 16, wherein during an association operation, the first STA is in the second mode for the association operation while the second STA is the first mode.

* * * * *